(12) United States Patent
Takehisa et al.

(10) Patent No.: US 12,134,573 B2
(45) Date of Patent: *Nov. 5, 2024

(54) ION REMOVAL SYSTEM

(71) Applicant: Panasonic Intellectual Property Management Co., Ltd., Osaka (JP)

(72) Inventors: Ayane Takehisa, Nara (JP); Takuya Kanda, Kyoto (JP); Tomohiro Akita, Osaka (JP); Yasunari Maeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 470 days.

This patent is subject to a terminal disclaimer.

(21) Appl. No.: 17/442,391

(22) PCT Filed: Feb. 10, 2020

(86) PCT No.: PCT/JP2020/005183
§ 371 (c)(1),
(2) Date: Sep. 23, 2021

(87) PCT Pub. No.: WO2020/195255
PCT Pub. Date: Oct. 1, 2020

(65) Prior Publication Data
US 2022/0169542 A1    Jun. 2, 2022

(30) Foreign Application Priority Data

Mar. 27, 2019  (JP) ................. 2019-061704
Jul. 30, 2019   (JP) ................. 2019-139359

(51) Int. Cl.
C02F 1/461    (2023.01)
C02F 1/62     (2023.01)
C02F 101/20   (2006.01)

(52) U.S. Cl.
CPC ............ *C02F 1/46104* (2013.01); *C02F 1/62* (2013.01); *C02F 2101/20* (2013.01); *C02F 2201/46145* (2013.01)

(58) Field of Classification Search
None
See application file for complete search history.

(56) References Cited

U.S. PATENT DOCUMENTS 5,580,445 A    12/1996  Iwatsuka et al.
5,728,274 A    3/1998   Kamitani et al.
(Continued)

FOREIGN PATENT DOCUMENTS

EP    0659483 A2    6/1995
EP    3056473 A1    8/2016
(Continued)

OTHER PUBLICATIONS

Extended European Search Report for corresponding European Application No. 20777932.3 issued Mar. 22, 2022.
(Continued)

*Primary Examiner* — Krishnan S Menon
(74) *Attorney, Agent, or Firm* — Renner, Otto, Boisselle & Sklar, LLP

(57) ABSTRACT

An ion removal system includes: an electrolysis device configured to generate alkaline water and acid water by electrolysis; a hard water flow path to supply the electrolysis device with hard water; a first flow path and a second flow path through which the alkaline water and the acid water generated by the electrolysis device can alternately flow; a fine bubble generation device configured to generate and supply fine bubbles to the hard water flow path, the first flow path, or the second flow path so as to adsorb and remove metal ions in water by the fine bubbles generated; and a controller, wherein the controller controls the electrolysis
(Continued)

device to perform a first mode in which the alkaline water is allowed to flow through the first flow path and the acid water is allowed to flow through the second flow path and a second mode in which the acid water is allowed to flow through the first flow path and the alkaline water is allowed to flow through the second flow path.

6 Claims, 20 Drawing Sheets

(56) References Cited

U.S. PATENT DOCUMENTS

| | | | |
|---|---|---|---|
| 11,339,072 | B2 | 5/2022 | Takehisa et al. |
| 2010/0219372 | A1 | 9/2010 | Hook et al. |
| 2011/0056876 | A1 | 3/2011 | Ide |
| 2014/0116889 | A1 | 5/2014 | Nakamoto |
| 2015/0225265 | A1 | 8/2015 | Terashima et al. |
| 2017/0113957 | A1 | 4/2017 | Eckelberry |
| 2017/0313602 | A1 | 11/2017 | Matsumoto et al. |
| 2019/0240629 | A1 | 8/2019 | Nakamoto |
| 2021/0221722 | A1 | 7/2021 | Maeda |

FOREIGN PATENT DOCUMENTS

| | | |
|---|---|---|
| EP | 3950601 A1 | 2/2022 |
| EP | 3950604 A1 | 2/2022 |
| JP | H08-182988 A | 7/1996 |
| JP | 3145240 B2 | 3/2001 |
| JP | 2004-271048 A | 9/2004 |
| JP | 2005-319427 A | 11/2005 |
| JP | 3122342 U | 6/2006 |
| JP | 2009-165954 A | 7/2009 |
| JP | 2009-165955 A | 7/2009 |
| JP | 2009-233503 A | 10/2009 |
| JP | 2010-221127 A | 10/2010 |
| JP | 2011-045802 A | 3/2011 |
| JP | 2011-056345 A | 3/2011 |
| JP | 2011-161407 A | 8/2011 |
| JP | 2013-013853 A | 1/2013 |
| JP | 2014-076421 A | 5/2014 |
| JP | 2015-213569 A | 12/2015 |
| JP | 2020-163364 A | 10/2020 |
| JP | 2020-163365 A | 10/2020 |
| WO | 2007/132685 A1 | 11/2007 |
| WO | 2010/067454 A1 | 6/2010 |
| WO | 2011142060 A1 | 11/2011 |
| WO | 2015052840 A1 | 4/2015 |
| WO | 2018/159693 A1 | 9/2018 |

OTHER PUBLICATIONS

First Examination Report for corresponding Indian Patent Application No. 202117042948 issued on Jan. 4, 2022.
First Examination Report for corresponding Indian Patent Application No. 202117042946 issued on Jan. 18, 2022.
International Search Report for corresponding Application No. PCT/JP2021/014900, mailed Jun. 22, 2021.
Publication technical report from Japan Institute of Invention and Innovation (Publication technical No. 2006-504982) as published on Sep. 12, 2006.
Commonly assigned, co-pending U.S. Appl. No. 17/925,820, filed Nov. 16, 2022.
Office Action dated Apr. 4, 2023 issued to Japanese Patent Application No. 2019-139357 which corresponds to U.S. Appl. No. 17/442,361 and its English translation.
Office Action dated Apr. 4, 2023 issued to Japanese Patent Application No. 2019-139359 which corresponds to U.S. Appl. No. 17/442,391 and its English translation.
EESR (Extended European Search Report) for related European Application No. 21807826.9 which corresponds to U.S. Appl. No. 17/925,820 issued Aug. 14, 2023.
Notice of Reasons for Refusal for related Japanese Application No. 2022-524322 which corresponds to U.S. Appl. No. 17/925,820, issued Sep. 5, 2023 and its English machine translation.
Decision of Refusal for related Japanese Application No. 2022-524322 dated Dec. 19, 2023 and its English machine translation.
International Preliminary Report on Patentability of related International Application No. PCT/JP2020/005179 dated Sep. 28, 2021 (English translation).
Office Action together with Search Report issued in corresponding CN Patent Application No. 202080023938.9 dated Nov. 10, 2022, with English language machine translation.
Office Action together with Search Report issued in corresponding CN Patent Application No. 202080023923.2 dated Nov. 22, 2022, with English language machine translation.
International Preliminary Report on Patentability for corresponding International Application No. PCT/JP2021/014900 (Chapter I of the Patent Cooperation Treaty) (IB/326) with an English translation thereof (IB/338), which corresponds to the related U.S. Appl. No. 17/925,820.
English translation of Publication technical report from Japan Institute of Invention and Innovation (Publication technical No. 2006-504982) as published on Sep. 12, 2006 (Japanese Publication technical report attached hereto was cited in the ISR in the PCT International application No. PCT/JP2021/014900 which corresponds to the related U.S. Appl. No. 17/925,820 and was filed without English translation as an I.D.S. in the present case on Nov. 18, 2022.).
International Preliminary Report on Patentability for corresponding International Application No. PCT/JP2020/005183 dated Sep. 28, 2021 (English translation).
Extended European Search Report for corresponding European Application No. 20778763.1 issued Mar. 18, 2022.
International Search Report for related Application No. PCT/JP2020/005179, mailed Apr. 21, 2020.
Commonly assigned, co-pending U.S. Appl. No. 17/442,361, filed Sep. 23, 2021.
International Search Report for corresponding Application No. PCT/JP2020/005183, mailed Apr. 21, 2020.
Office Action for related U.S. Appl. No. 17/442,361 dated Mar. 14, 2024.

(a)          (b)

ION REMOVAL SYSTEM

TECHNICAL FIELD

The present invention relates to an ion removal system.

BACKGROUND ART

A conventional ion removal system for removing metal ions in hard water has been disclosed (see, for example, Patent Document 1).

The ion removal system of Patent Document 1 includes a hard water storage unit that stores hard water, and a fine bubble generation means that generates and supplies fine bubbles to the hard water storage unit. In the hard water storage unit, metal ions in the hard water are adsorbed to fine bubbles, and metal ions are removed from the hard water.

PRIOR ART DOCUMENT

Patent Document

Patent Document 1: WO 2018-159693 A1

SUMMARY OF THE INVENTION

Problems to be Solved by the Invention

Recently, it is required to enhance removing effect of metal ions by fine bubbles. As in the system disclosed in Patent Document 1, there is still room for improvement in enhancing removing effect of metal ions by fine bubbles.

Therefore, an object of the present invention is to solve the above problem, and to provide an ion removal system capable of enhancing removing effect of metal ions.

Means for Solving the Problems

In order to achieve the above object, an ion removal system of the present invention includes: an electrolysis device configured to generate alkaline water and acid water by electrolysis; a hard water flow path connected to the electrolysis device to supply the electrolysis device with hard water; a batch treatment tank provided in the hard water flow path to store the hard water; a return flow path connected to the batch treatment tank to return the alkaline water or the acid water generated by the electrolysis device to the batch treatment tank; and a fine bubble generation device configured to generate fine bubbles in a circulation flow path including the batch treatment tank, the electrolysis device, and the return flow path, the fine bubble generation device being configured to adsorb and remove metal ions in water by the fine bubbles generated.

Effects of the Invention

According to an ion removal system of the present invention, removing effect of metal ions can be enhanced.

MODES FOR CARRYING OUT THE INVENTION

Embodiments according to the present invention will be described in detail with reference to the drawings. The present invention is not limited by the embodiments.

First Embodiment

Figure 1:
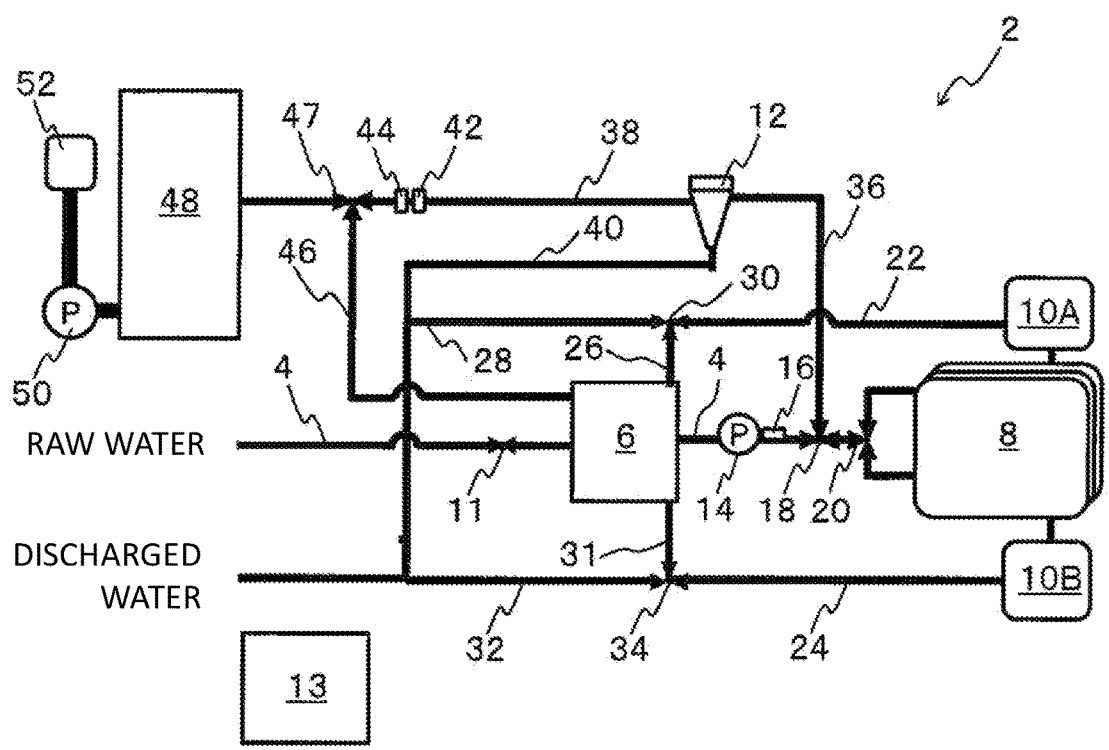
FIG. 1 is a schematic diagram of an ion removal system according to a first embodiment.

FIG. 1 is a schematic diagram of an ion removal system 2 according to a first embodiment.

The ion removal system 2 is a system for removing metal ions from hard water using fine bubbles. The metal ions here are calcium ions ($Ca^{2+}$) and magnesium ions ($Mg^{2+}$). The ion removal system 2 in the first embodiment is a water softening device configured to remove and separate metal ions from hard water to reduce a concentration (hardness) of metal ions in hard water to a predetermined concentration or less, thereby producing soft water. As definition of hard water and soft water, for example, the WHO definition may be applied. That is, water with a hardness of less than 120 mg/L may be defined as soft water, and water with a hardness of 120 mg/L or more may be defined as hard water.

The fine bubbles in the first embodiment are bubbles having a diameter of 100 μm or less. The fine bubbles include microbubbles (having a diameter of, for example, 1 μm or more and 100 μm or less) and nanobubbles (having a diameter of, for example, less than 1 μm). The microbubble may be a bubble having a diameter that can be recognized as a microorder bubble diameter by a person skilled in the art of water treatment. The nanobubble may be a bubble having a diameter that can be recognized as a nano-order bubble diameter by a person skilled in the art of water treatment. The fine bubbles have properties different from those of ordinary bubbles, such as a long residence time in water, difficulty in increasing the diameter of the bubble as a single substance, difficulty in coalescing with other bubbles, and a large contact area and easy chemical reaction.

The fine bubbles may include bubbles (such as millibubbles) having a diameter of 100 μm or more at a small ratio. For example, bubbles including bubbles having a diameter of 100 μm or less at a ratio of 90% or more may be defined as the fine bubbles. In addition to this, a condition that the ratio of bubbles having the diameter of 60 μm or less is 50% or more and the ratio of bubbles having the diameter of 20 μm or less is 5% or more may be added for the definition. When the diameter (bubble diameter) of the bubble is measured, for example, hard water containing fine bubbles may be directly imaged by a high-speed camera, and the bubble diameter may be calculated by a three-point method by image processing, or the bubble diameter may be measured by any other method. The bubble diameter may be measured at any timing as long as the fine bubbles are retained. An example of the conditions of the measurement method using the high-speed camera described above is as follows.

High-speed camera: FASTCAM 1024 PCI (PHOTRON LIMITED)
Lens system: Z16 APO (Leica)
Objective lens: Planapo 2.0× (Leica)
Imaging speed: 1000 fps
Shutter speed: 1/505000 sec
Image area: 1024×1024 pixels (microbubble imaging region 1.42 mm×1.42 mm, millibubble imaging region 5.69 mm×5.69 mm)
Image processing software: Image-Pro Plus (Media Cybermetrics)

The ion removal system 2 illustrated in FIG. 1 includes a hard water flow path 4, a batch treatment tank 6, an electrolysis device 8, fine bubble generation devices 10A, 10B, a separation device 12, and a controller 13.

The hard water flow path 4 is a flow path for supplying hard water to the electrolysis device 8. The hard water flow path 4 is connected to water source (not illustrated) of hard water. The hard water flow path 4 of the first embodiment is connected to the electrolysis device 8 so as to supply hard water to the electrolysis device 8 via the batch treatment tank 6.

At a point where the hard water flow path 4 is connected to the electrolysis device 8, the hard water flow path 4 is branched into two flow paths. The two flow paths correspond to the fine bubble generation devices 10A, 10B described later, respectively.

In addition to the batch treatment tank 6, a valve 11, a pump 14, a flow rate sensor 16, a valve 18, and a valve 20 are provided in the hard water flow path 4.

The batch treatment tank 6 is a tank provided in the hard water flow path 4. The batch treatment tank 6 stores hard water supplied from the hard water flow path 4. The batch treatment tank 6 enables batch treatment.

The valve 11 is a valve (an electromagnetic valve in the first embodiment) configured to control water flow from the hard water flow path 4 to the batch treatment tank 6. The pump 14 is a pump for supplying hard water stored in the batch treatment tank 6 to the electrolysis device 8. The flow rate sensor 16 is a sensor configured to measure a flow rate of hard water supplied from the batch treatment tank 6 to the electrolysis device 8.

The electrolysis device 8 is a device configured to generate alkaline water and acid water by electrolyzing hard water supplied from the hard water flow path 4. A first flow path 22 and a second flow path 24 are connected to the electrolysis device 8 as two flow paths.

The first flow path 22 and the second flow path 24 are flow paths through which alkaline water and acid water generated by the electrolysis device 8 can alternately flow. When alkaline water is allowed to flow through the first flow path 22, acid water is allowed to flow through the second flow path 24. When acid water is allowed to flow through the first flow path 22, alkaline water is allowed to flow through the second flow path 24.

The fine bubble generation device 10A is provided in the first flow path 22. Similarly, the fine bubble generation device 10B is provided in the second flow path 24.

The fine bubble generation devices 10A, 10B are devices configured to generate and supply fine bubbles to the first flow path 22 and the second flow path 24, respectively. By supplying the fine bubbles to each flow path, metal ions contained in water flowing through the flow path can be adsorbed to the fine bubbles and removed from the water. The fine bubble generation devices 10A, 10B of the first embodiment are devices configured to generate fine bubbles by cavitation action. The fine bubble generation devices 10A, 10B automatically supply fine bubbles to water flowing through the fine bubble generation devices 10A, 10B.

A first return flow path 26 and a first discharge flow path 28 are connected to the first flow path 22. The first return flow path 26 is a flow path connected from the first flow path 22 to the batch treatment tank 6. The first discharge flow path 28 is a flow path extending from the first flow path 22 to the outside of the ion removal system 2 without flowing through the batch treatment tank 6.

A valve 30 is provided at a position where the first return flow path 26 and the first discharge flow path 28 are connected to the first flow path 22. The valve 30 is a valve (electric valve in the first embodiment) for switching to allow water flow from the first flow path 22 to the first return flow path 26 or to the first discharge flow path 28.

A second return flow path 31 and a second discharge flow path 32 are connected to the second flow path 24. The second return flow path 31 is a flow path connected from the second flow path 24 to the batch treatment tank 6. The second discharge flow path 32 is a flow path extending from the second flow path 24 to the outside of the ion removal system 2 without flowing through the batch treatment tank 6.

A valve 34 is provided at a position where the second return flow path 31 and the second discharge flow path 32 are connected to the second flow path 24. The valve 34 is a valve (electric valve in the first embodiment) for switching to allow water flow from the second flow path 24 to the second return flow path 31 or to the second discharge flow path 32.

The connection points at which the first return flow path 26 and the second return flow path 31 described above are connected to the hard water flow path 4 correspond to the batch treatment tank 6 in the first embodiment. A branch flow path 36 is connected to the hard water flow path 4 at a point downstream of the batch treatment tank 6 corresponding to the connection point. The branch flow path 36 is a flow path branched from the hard water flow path 4 at a point between the batch treatment tank 6 and the electrolysis device 8.

The valve 18 described above is provided at a position where the branch flow path 36 is connected to the hard water flow path 4. The valve 18 is a valve (electric valve in the first embodiment) for switching between allowing and stopping water flow from the hard water flow path 4 to the branch flow path 36. The valve 20 provided downstream of the valve 18 is a valve (electric valve in the first embodiment) capable of adjusting a ratio for the flow rate of water flow through each of the first flow path 22 and the second flow path 24.

The separation device 12 is connected to the branch flow path 36. The separation device 12 is a device configured to separate crystals of metal component from water. The separation device 12 of the first embodiment is a cyclone-type separation device configured to separate solids such as crystals contained in water by centrifugal separation.

A third flow path 38 and a third discharge flow path 40 are connected to the separation device 12. The third flow path 38 is a flow path through which the treated water flows, where the crystals have been separated by the separation device 12. The discharge flow path 40 is a flow path through which discharge water containing crystals separated by the separation device 12 flows. The discharge flow path 40 extends to the outside of the ion removal system 2 without flowing through the batch treatment tank 6, similar to the first discharge flow path 28 and the second discharge flow path 32 described above.

A pH sensor 42 and a turbidity sensor 44 are provided in the third flow path 38. The pH sensor 42 and the turbidity sensor 44 are sensors configured to measure a pH value and a turbidity, respectively, of the treated water flowing through the third flow path 38.

A third return flow path 46 is further connected to a middle of the third flow path 38. The third return flow path 46 is a flow path connected between the third flow path 38 and the batch treatment tank 6.

A valve 47 is provided at a position where the third return flow path 46 is connected to the third flow path 38. The valve 47 is a valve (electric valve in the first embodiment) for switching between allowing and stopping water flow from the third flow path 38 to the third return flow path 46.

Further, a water storage tank 48 is connected to the third flow path 38. The water storage tank 48 is a tank configured to store the treated water supplied from third flow path 38. The treated water stored in the water storage tank 48 is supplied to a water faucet 52 by a pump 50. Driving the pump 50 supplies the treated water (that is, soft water) obtained by treating hard water by the ion removal system 2 to the water faucet 52 for use.

The controller 13 is a member configured to control each component of the ion removal system 2 described above. The controller 13 performs opening and closing control of each valve, ON/OFF control of each pump, ON/OFF control of the electrolysis device 8, ON/OFF control of the separation device 12, and the like. The controller 13 is, for example, a microcomputer.

The controller 13 operates the ion removal system 2 in a plurality of operation modes. These operation modes will be described.

(Raw Water Injection Mode)

Figure 2A:
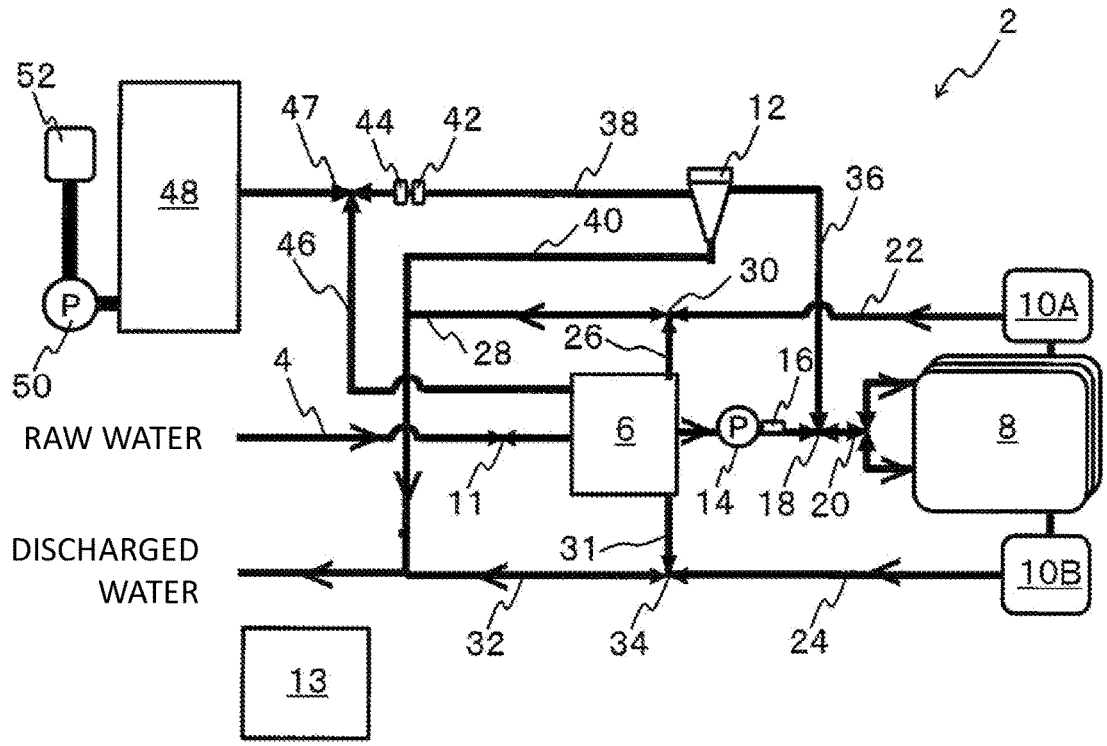
FIG. 2A is a diagram illustrating water flow in a first stage of a raw water injection mode in the first embodiment.
Figure 2B:
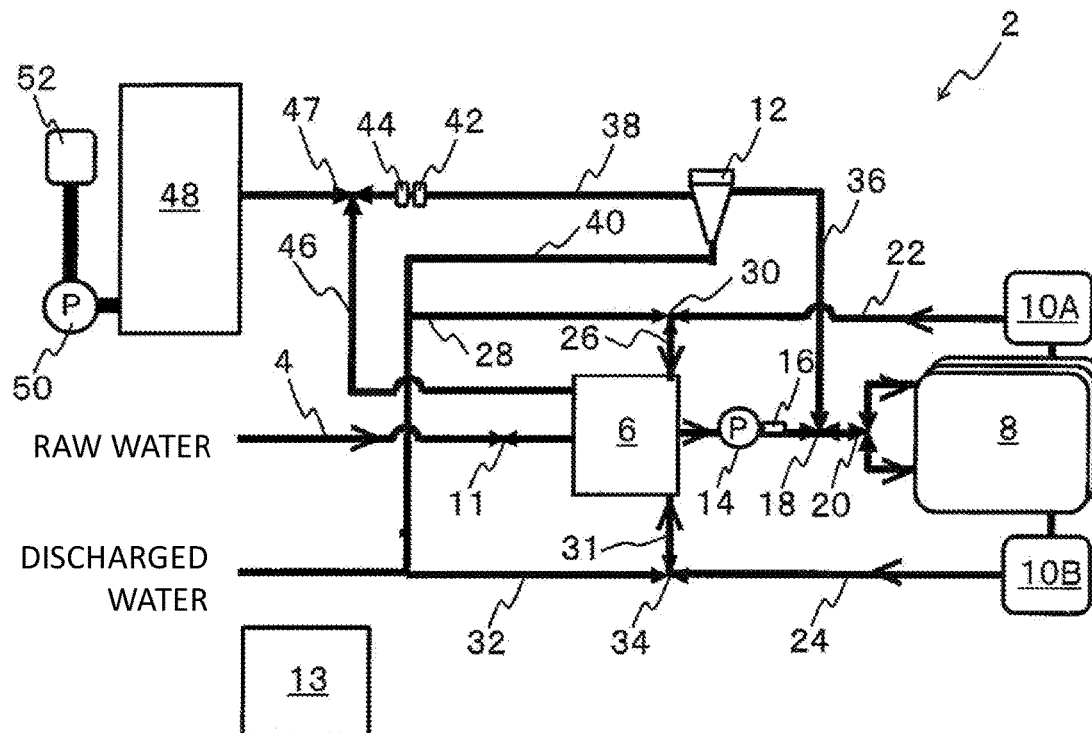
FIG. 2B is a diagram illustrating water flow in a second stage of the raw water injection mode in the first embodiment.

A raw water injection mode is a mode in which hard water as raw water is injected into a flow path when the operation of the ion removal system 2 is started. Specifically, the controller 13 performs control to generate water flow as illustrated in FIGS. 2A and 2B. In FIGS. 2A and 2B and subsequent drawings, a water flow is represented by an arrow, and it is assumed that no water flow occurs in a flow path without an arrow.

FIG. 2A illustrates a mode for discharging residual water remaining in flow paths as a first stage of the raw water injection mode. As illustrated in FIG. 2A, the controller 13 opens the valve 11 to flow hard water through the hard water flow path 4, and drives the pump 14 to supply the electrolysis device 8 with the hard water in the batch treatment tank 6. At this time, the controller 13 acquires the flow rate of hard water flowing from the batch treatment tank 6 to the electrolysis device 8 on the basis of a detection result of the flow rate sensor 16. The controller 13 further controls the valve 18 to prevent hard water from flowing from the hard water flow path 4 to the branch flow path 36. The controller 13 does not drive the electrolysis device 8 so that hard water flowing through the hard water flow path 4 is allowed to directly flow to the first flow path 22 and the second flow path 24. The controller 13 further controls the valve 30 such that hard water flowing through the first flow path 22 is allowed to flow into the first discharge flow path 28, and controls the valve 34 such that hard water flowing through the second flow path 24 is allowed to flow into the second discharge flow path 32. As a result, water flows are generated as illustrated by arrows in FIG. 2A, and residual water remaining in flow paths is discharged.

FIG. 2B illustrates a mode for injecting new hard water into the batch treatment tank 6 as a second stage of the raw water injection mode. The controller 13 changes the opening and closing of the valves 30, 34 from the state illustrated in FIG. 2A. Specifically, the valve 30 is controlled such that hard water flowing through the first flow path 22 is allowed to flow into the first return flow path 26, and the valve 34 is controlled such that hard water flowing through the second flow path 24 is allowed to flow into the second return flow path 31. As a result, water flow is generated as illustrated by arrows in FIG. 2B, and new hard water is injected into the batch treatment tank 6.

After the raw water injection mode described above is performed, a first crystallization treatment mode or a second crystallization treatment mode described below is performed.

(First Crystallization Treatment Mode (First Mode))

Figure 3A:
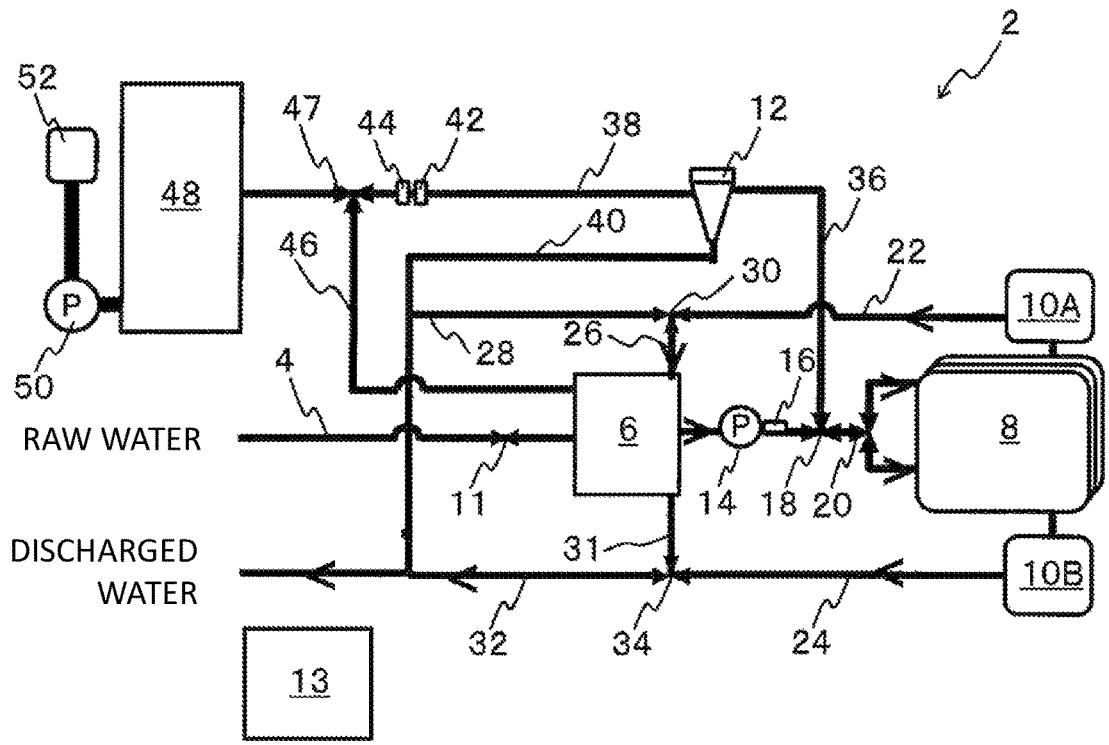
FIG. 3A is a diagram illustrating water flow in a first crystallization treatment mode in the first embodiment.

FIG. 3A illustrates a first crystallization treatment mode. The controller 13 closes the valve 11 and drives the pump 14 so as to supply the electrolysis device 8 with the hard water stored in the batch treatment tank 6. The controller 13 controls the valve 18 so that water is not allowed to flow from the hard water flow path 4 to the branch flow path 36. The controller 13 further drives the electrolysis device 8 to generate alkaline water and acid water. Specifically, the electrolysis device 8 electrolyzes hard water supplied from the batch treatment tank 6 to generate alkaline water and acid water. The controller 13 can control a ratio of flow rate between alkaline water and acid water generated by electrolysis device 8 on the basis of an opening degree of the valve 20.

Among the alkaline water and the acid water generated by the electrolysis device 8, in the first crystallization treatment mode, the controller 13 controls the electrolysis device 8 so that the alkaline water is allowed to flow through the first flow path 22 and the acid water is allowed to flow through the second flow path 24.

The controller 13 further controls the valve 30 such that alkaline water flowing through the first flow path 22 is allowed to flow into the first return flow path 26, and controls the valve 34 such that acid water flowing through the second flow path 24 is allowed to flow into the second discharge flow path 32. As a result, water flows are generated as illustrated by arrows in FIG. 3A.

In the flow illustrated in FIG. 3A, a circulation flow path is formed through which alkaline water flows in a loop in the order of the batch treatment tank 6, the electrolysis device 8, the first flow path 22, and the first return flow path 26. The first flow path 22 functions as a return flow path together with the first return flow path 26. In the circulation flow path, fine bubbles are supplied from the fine bubble generation device 10A to the alkaline water flowing through the first flow path 22. By supplying the fine bubbles, metal ions contained in the alkaline water are adsorbed by the fine bubbles and removed from the alkaline water. A principle of removal of metal ions by the fine bubbles will be described later.

The hard water subjected to the metal ion removal treatment becomes "treated water" and is stored in the batch treatment tank 6. Thereafter, the treated water is sucked by the pump 14 and sent to the electrolysis device 8, and fine bubbles are supplied again thereto by the fine bubble generation device 10A. As the treated water flows through the circulation flow path, fine bubbles are continuously supplied to the treated water, and the metal ion removal treatment is continuously performed.

Circulating alkaline water in the circulation flow path continuously removes metal ions by fine bubbles while increasing a pH value of the water flowing through the circulation flow path. With the increased pH value, OH⁻ having a negative charge present on surfaces of the fine bubble is increased, and then $Ca^{2+}$ is easily adsorbed to the fine bubble. As a result, crystallization of metal ions can be promoted as described later, and removing effects of metal ions can be enhanced. Circulating alkaline water containing crystals of metal component can crystallize metal ions contained in water in a form of adhering to the crystals, and crystallization of the metal ions can be further promoted.

The acid water flowing through the second flow path 24 is discharged to the outside of the ion removal system 2 via the second discharge flow path 32.

(Second Crystallization Treatment Mode (Second Mode))

Figure 3B:
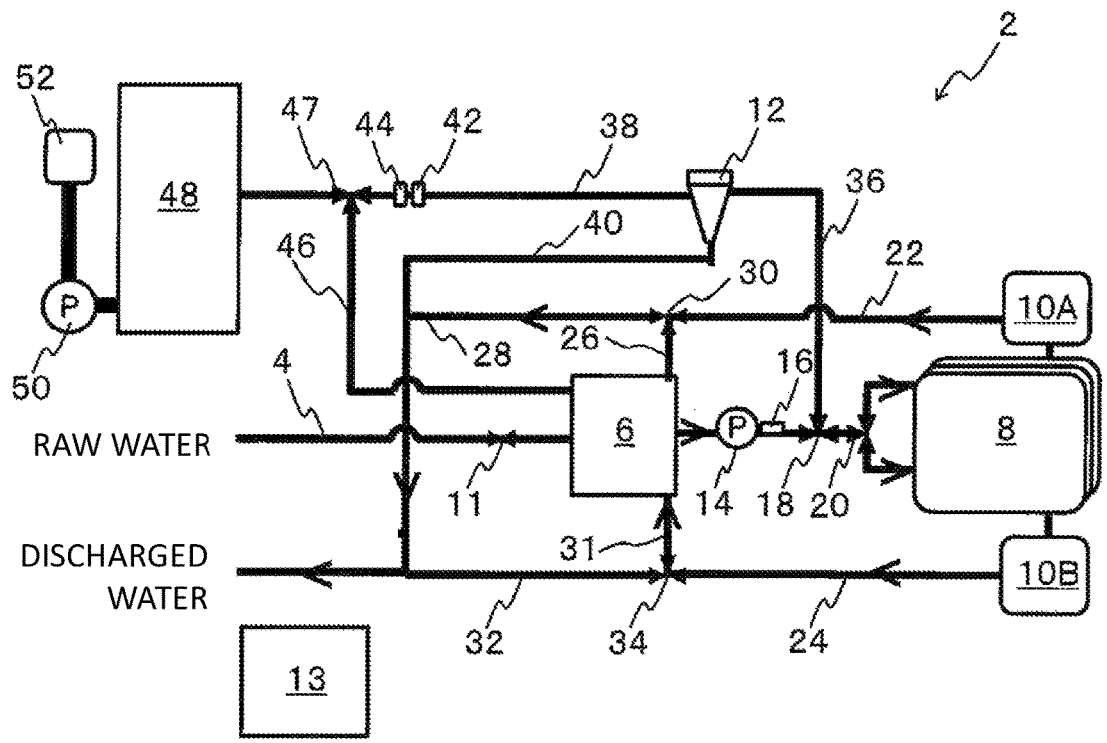
FIG. 3B is a diagram illustrating water flow in a second crystallization treatment mode in the first embodiment.

FIG. 3B illustrates a second crystallization treatment mode. In the second crystallization treatment mode, different from the first crystallization treatment mode illustrated in FIG. 3A, the controller 13 controls the electrolysis device 8 so that generated acid water is allowed to flow through the first flow path 22 and generated alkaline water is allowed to flow through the second flow path 24. The controller 13 further controls the valve 30 such that the acid water flowing through first flow path 22 is allowed to flow through the first discharge flow path 28, and controls the valve 34 such that the alkaline water flowing through the second flow path 24 is allowed to flow through the second return flow path 31. As a result, water flows are generated as illustrated by arrows in FIG. 3B.

In the flows illustrated in FIG. 3B, a circulation flow path is formed through which alkaline water flows in a loop in the order of the batch treatment tank 6, the electrolysis device 8, the second flow path 24, and the second return flow path 31. The second flow path 24 functions as a return flow path together with the second return flow path 31. In the circulation flow path, fine bubbles are supplied from the fine bubble generation device 10B to the alkaline water flowing through the second flow path 24. By supplying the fine bubbles, metal ions contained in the alkaline water are adsorbed by the fine bubbles and removed from the alkaline water. The hard water subjected to the metal ion removal treatment becomes "treated water" and is stored in the batch treatment tank 6. Thereafter, the treated water is sucked by the pump 14 and sent to the electrolysis device 8, and fine bubbles are supplied again by the fine bubble generation device 10B. As the treated water flows through the circulation flow path, fine bubbles are continuously supplied to the treated water, and the metal ion removal treatment is continuously performed.

As similar to the first crystallization treatment mode, circulating alkaline water in the circulation flow path can continuously remove metal ions by the fine bubbles while increasing the pH value of water flowing through the circulation flow path. As a result, similar effects to the first crystallization treatment mode can be achieved.

The acid water flowing through the first flow path 22 is discharged to the outside of the ion removal system 2 via the first discharge flow path 28.

After the first crystallization treatment mode or the second crystallization treatment mode described above is performed, a treated water supply mode described below is performed.

(Treated Water Supply Mode (Third Mode))

Figure 4:
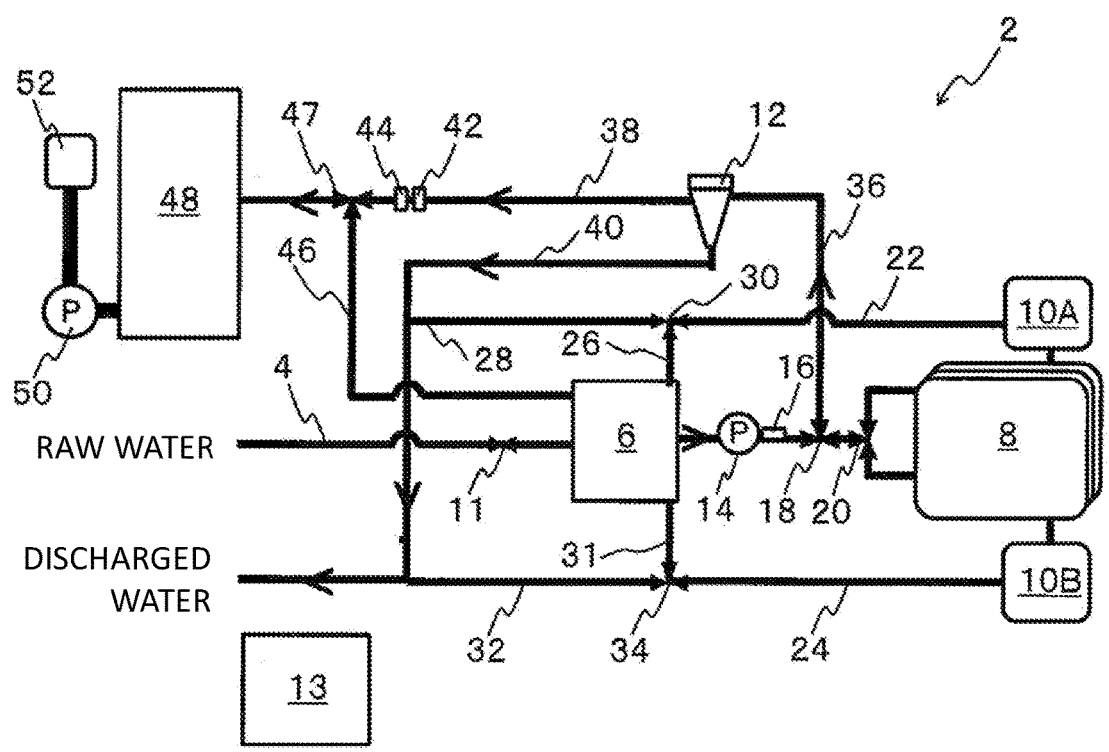
FIG. 4 is a diagram illustrating water flow in a treated water supply mode in the first embodiment.

FIG. 4 illustrates a treated water supply mode. The treated water supply mode is an operation mode in which treated water obtained by treating hard water in the first crystallization treatment mode and the second crystallization treatment mode is supplied to the water faucet 52.

First, the controller 13 controls the valve 18 so that water is allowed to flow into the branch flow path 36. Driving the pump 14 in this state allows the treated water stored in the batch treatment tank 6 to flow through the branch flow path 36. At this time, the controller 13 controls the valve 20 so that water is not allowed to flow through the electrolysis device 8.

The treated water flowing through the branch flow path 36 is sent to the separation device 12. The separation device 12 separates crystals of metal component contained in the treated water. The separation device 12 further supplies the treated water, from which the crystals have been separated, to the third flow path 38, while allowing the discharge water containing the crystals to flow through the third discharge flow path 40.

The treated water flowing through the third flow path 38 is stored in water storage tank 48. Thereafter, operating the pump 50 supplies the water faucet 52 with the treated water (that is, soft water) stored in the water storage tank 48, and the treated water becomes available at the water faucet 52.

The controller 13 alternately performs a control of sequentially performing the raw water injection mode, the first crystallization treatment mode, and the treated water supply mode described above, and a control of sequentially performing the raw water injection mode, the second crystallization treatment mode, and the treated water supply mode. In both the first crystallization mode and the second crystallization mode, a circulation flow path is formed to include the batch treatment tank 6, the electrolysis device 8, and the return flow paths 26, 31, and the acid water is discharged to the outside of the ion removal system 2 while circulating alkaline water in the circulation flow path. Alternately performing of the first crystallization treatment mode and the second crystallization treatment mode can clean the flow path through which the alkaline water has flowed with the acid water, and the flow path can be maintained to be suitable for metal ion removal treatment. As a result, removing effects of metal ions by the fine bubbles can be enhanced.

As different modes from the above-described modes, the controller 13 can perform a first cleaning mode, a second cleaning mode, and an abnormality-occurrence mode described below.

(First Cleaning Mode)

Figure 5A:
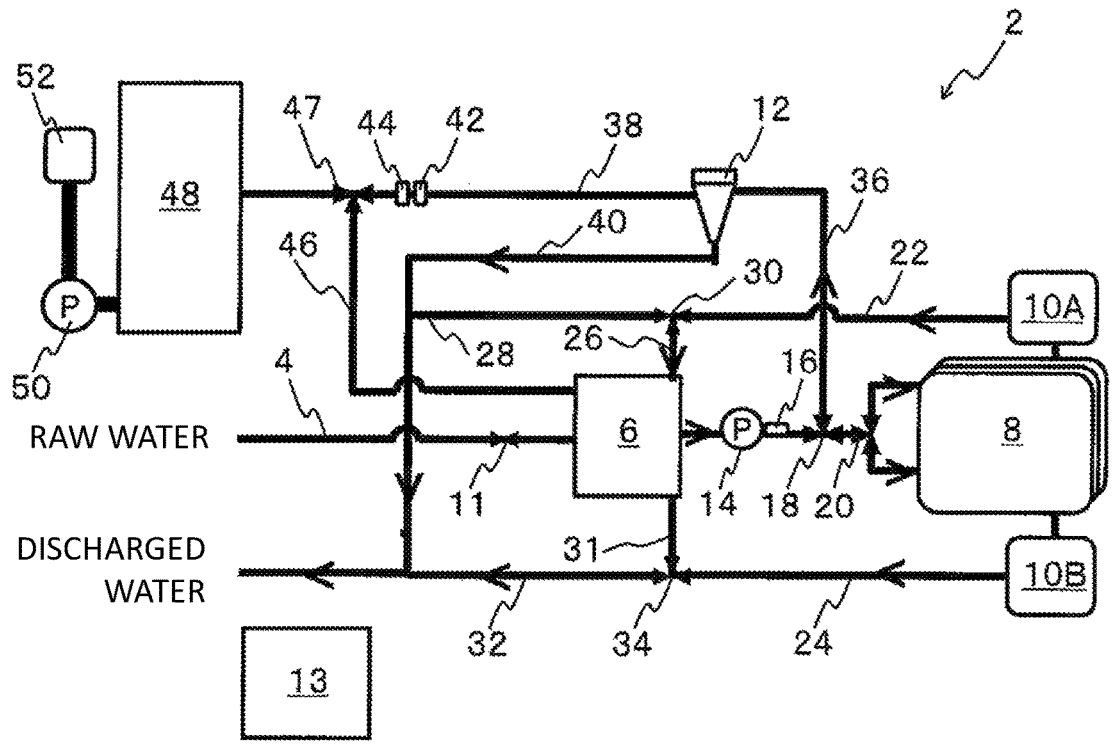
FIG. 5A is a diagram illustrating water flow in a first cleaning mode in the first embodiment.

FIG. 5A illustrates a first cleaning mode. The controller 13 controls the valve 18 so that water flows from the hard water flow path 4 to both the electrolysis device 8 and the branch flow path 36. The controller 13 further drives the electrolysis device 8 to generate alkaline water and acid water.

In the first cleaning mode, the electrolysis device 8 is controlled such that generated acid water is allowed to flow through the first flow path 22 and generated alkaline water is allowed to flow through the second flow path 24. The valve 30 is controlled such that acid water flowing through the first flow path 22 is allowed to flow through the first return flow path 26, and the valve 34 is controlled such that alkaline water flowing through the second flow path 24 is allowed to flow through the second discharge flow path 32. As a result, water flows are generated as illustrated by arrows in FIG. 5A.

In the flows illustrated in FIG. 5A, a circulation flow path is formed through which the acid water flows in the order of the batch treatment tank 6, the electrolysis device 8, the first flow path 22, and the first return flow path 26, and the acid water is continuously supplied to the batch treatment tank 6. Part of the acid water flowing through the circulation flow path is allowed to flow through the branch flow path 36. By allowing the acid water to flow through the first return flow path 26 and the branch flow path 36 through which the acid water does not flow in the first crystallization treatment mode and the second crystallization treatment mode described above, these flow paths can be cleaned, and a state suitable for the metal ion removal treatment can be maintained.

The acid water that has been allowed to flow through the branch flow path 36 reaches the separation device 12. In the first cleaning mode, the separation device 12 is controlled so as not to perform the crystal separation treatment in the separation device 12. The separation device 12 is further controlled such that the acid water sent to separation device 12 is not allowed to flow through the third flow path 38 but allowed to flow through the third discharge flow path 40. As a result, acid water is allowed to flow through the third discharge flow path 40, so that the third discharge flow path 40 can be cleaned.

According to the above-described control, it is possible to clean each flow path while circulating acid water in the circulation flow path. Further, acid water used for cleaning can be appropriately discharged from the third discharge flow path 40 via the branch flow path 36.

(Second Cleaning Mode)

Figure 5B:
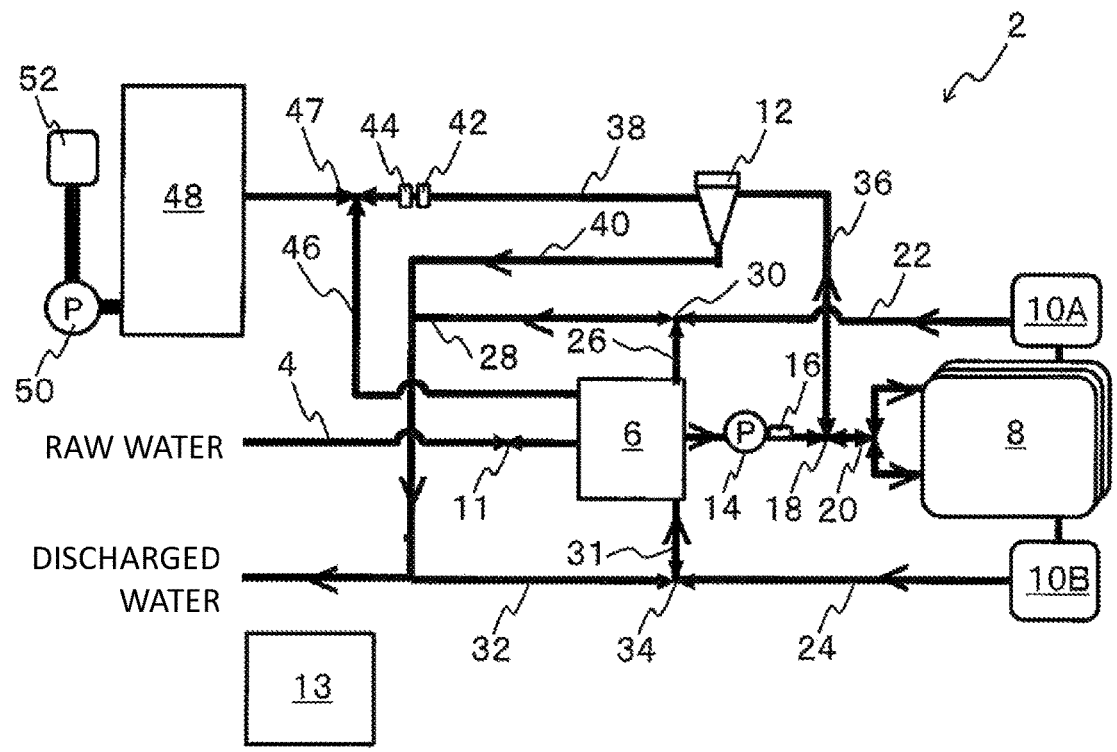
FIG. 5B is a diagram illustrating water flow in a second cleaning mode in the first embodiment.

FIG. 5B illustrates a second cleaning mode. Unlike the first cleaning mode, the controller 13 controls the electrolysis device 8 such that generated alkaline water is allowed to flow through the first flow path 22 and generated acid water is allowed to flow through the second flow path 24. The controller 13 further controls the valve 30 such that alkaline water flowing through the first flow path 22 flows through the first discharge flow path 28, and controls the valve 34 such that acid water flowing through the second flow path 24 flows through the second return flow path 31. As a result, water flows are generated as illustrated by arrows in FIG. 5B.

In the flow illustrated in FIG. 5B, a circulation flow path is formed through which the acid water flows in the order of the batch treatment tank 6, the electrolysis device 8, the second flow path 24, and the second return flow path 31, and the acid water is continuously supplied to the batch treatment tank 6. Part of the acid water flowing through the circulation flow path is allowed to flow through the branch flow path 36. In the first crystallization treatment mode and the second crystallization treatment mode described above, acid water can be allowed to flow through the second return flow path 31 and the branch flow path 36 where the acid water does not flow, to perform cleaning.

According to the control described above, as similar to the first cleaning mode, flow paths can be cleaned while circulating the acid water in the circulation flow path, and the acid water used for cleaning can be appropriately discharged from the third discharge flow path 40.

The first cleaning mode and the second cleaning mode described above may be performed at predetermined timing or any timing.

(Abnormality Occurrence Mode)

In the treated water supply mode illustrated in FIG. 4, measurement values of the pH sensor 42 and the turbidity sensor 44 may be detected as abnormal values with respect to the treated water flowing from the third flow path 38 to the water storage tank 48. In such a case, the abnormality occurrence mode described below is performed in order to stop the flow of the treated water to the water storage tank 48.

Figure 6:
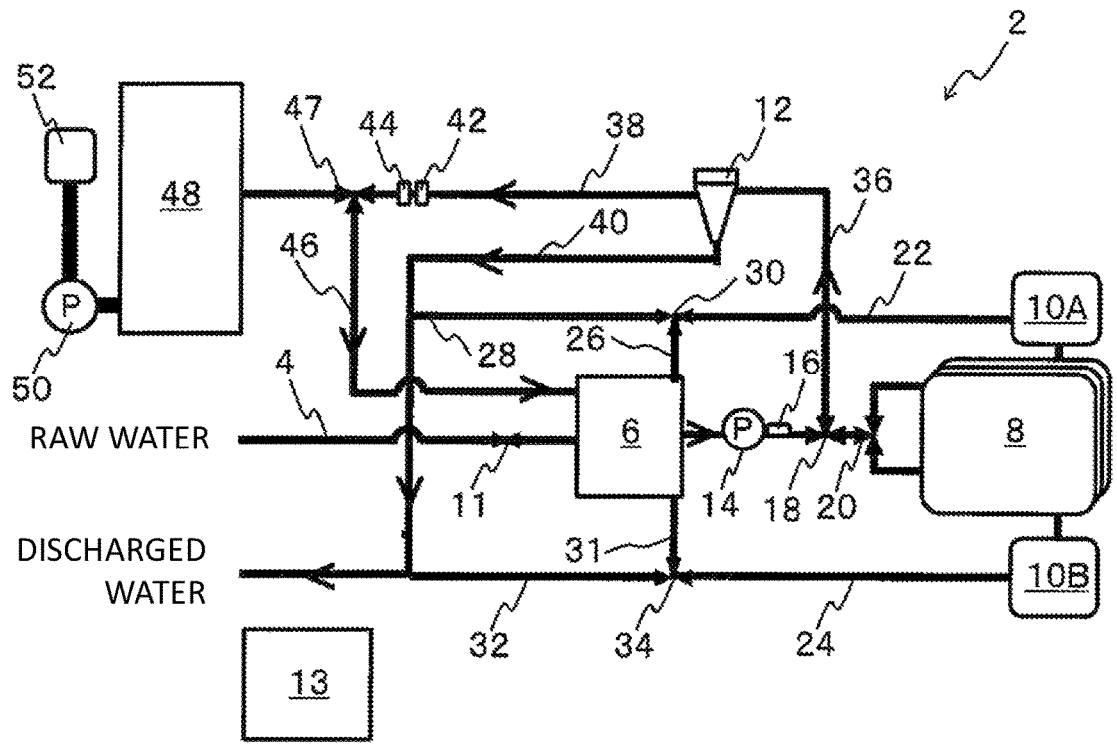
FIG. 6 is a diagram illustrating water flow in an abnormality occurrence mode in the first embodiment.

FIG. 6 illustrates the abnormality occurrence mode. The controller 13 changes the opening and closing control of the valve 47 from the treated water supply mode illustrated in FIG. 4. Specifically, the valve 47 are controlled to stop water flow in a flow path from the third flow path 38 to the water storage tank 48 with allowing water flow from the third flow path 38 to the third return flow path 46. As a result, water flows are generated as illustrated by arrows in FIG. 6.

Stopping the water flow from the third flow path 38 to the water storage tank 48 makes it possible to stop the supply of the treated water in which the abnormal value of the pH value or the turbidity is detected.

<Operation and Effect 1>

The ion removal system 2 having the above-described configuration includes the hard water flow path 4, the batch treatment tank 6, the electrolysis device 8, the fine bubble generation devices 10A, 10B, and the return flow paths 26, 31. The hard water flow path 4 is a flow path connected to the electrolysis device 8, and supplies the electrolysis device 8 with hard water. The batch treatment tank 6 is a tank provided in the hard water flow path 4 to store the hard water. The electrolysis device 8 is a device configured to generate alkaline water and acid water by electrolysis. The return flow paths 26, 31 are flow paths connected to the batch treatment tank 6 to return alkaline water or acid water generated by the electrolysis device 8 to the batch treatment tank 6. The fine bubble generation devices 10A, 10B are devices configured to generate and supply fine bubbles to a circulation flow path including the batch treatment tank 6, the electrolysis device 8, and the return flow paths 26, 31, and to adsorb and remove metal ions in water by the fine bubbles generated.

According to the configuration, circulating the alkaline water through the circulation flow path can remove metal ions by fine bubbles while increasing the pH value of the water flowing through the circulation flow path. As a result, crystallization of the metal ions removed by the fine bubbles can be promoted, and removing effects of the metal ions can be enhanced.

The ion removal system 2 of the first embodiment further includes the first flow path 22 and the second flow path 24 through which the alkaline water and the acid water generated by the electrolysis device 8 can alternately flow. The return flow paths 26, 31 include the first return flow path 26 branched from the first flow path 22 and connected to the batch treatment tank 6, and the second return flow path 31 branched from the second flow path 24 and connected to the batch treatment tank 6.

According to the configuration, allowing the alkaline water and the acid water to alternately flow through the first flow path 22 and the second flow path 24 makes it possible to allow the acid water to flow through the respective flow paths after allowing the alkaline water to flow through the respective flow paths, thereby cleaning the respective flow paths with the acid water.

The ion removal system 2 of the first embodiment further includes the first discharge flow path 28 connected to the first flow path 22 and extending to the outside of the system without flowing through the batch treatment tank 6, and a second discharge flow path 32 connected to the second flow path 24 and extending to the outside of the system without flowing through the batch treatment tank 6. The ion removal system 2 further includes the valve (first valve) 30 configured to switch water flow from the first flow path 22 between to the first return flow path 26 and to the first discharge flow path 28, and the valve (second valve) 34 configured to switch water flow from the second flow path 24 between to the second return flow path 31 and to the second discharge flow path 32.

According to the configuration, providing the discharge flow paths 28, 32 in addition to the return flow paths 26, 31 makes it possible to perform control to allow the acid water to flow through one of the discharge flow paths 28, 32 to be discharged while allowing the alkaline water to flow through one of the return flow paths 26, 31. Furthermore, such flows of the alkaline water and the acid water can be alternately generated in the first flow path 22 and the second flow path 24.

The ion removal system 2 of the first embodiment further includes the branch flow path 36 and the valve (third valve) 18. The branch flow path 36 is a flow path branched from the hard water flow path 4 at a point downstream of the batch treatment tank 6 that is a connection point where the return flow paths 26, 31 are connected to the hard water flow path 4. The valve 18 is a valve configured to switch between allowing and stopping water flow from the hard water flow path 4 to the branch flow path 36.

According to the configuration, allowing the water accumulated in the batch treatment tank 6 to flow through the branch flow path 36 can allow the treated water treated in the circulation flow path and accumulated in the batch treatment tank 6 to flow to the outside of the circulation flow path. As a result, the treated water can be supplied to the water faucet 52 for use.

The ion removal system 2 of the first embodiment further includes the separation device 12 connected to the branch flow path 36 to separate crystals of metal component contained in water flowing through the branch flow path 36.

According to the configuration, separating the crystals of the metal component from the treated water can make the soft water from which the crystals are separated.

<Operation and Effect 2>

According to the ion removal system 2 described above, the controller 13 performs the first crystallization treatment mode (first mode) and the second crystallization treatment mode (second mode). The first crystallization treatment mode is a mode in which alkaline water is allowed to flow through the first flow path 22 and acid water is allowed to flow through the second flow path 24. The second crystallization treatment mode is a mode in which acid water is allowed to flow through the first flow path 22 and alkaline water is allowed to flow through the second flow path 24.

According to the control, allowing the alkaline water and the acid water to alternately flow through the first flow path 22 and the second flow path 24 makes it possible to allow the acid water to flow through the respective flow paths after allowing the alkaline water to flow through the respective flow paths, thereby cleaning the respective flow paths with the acid water. As a result, each flow path can be maintained in a state suitable for metal ion removal processing, and removing effects of metal ions by fine bubbles can be enhanced.

According to the ion removal system 2 of the first embodiment, the controller 13 controls the valves 30, 34 to allow water flow from the first flow path 22 to the first return flow path 26 with stopping the water flow from the second flow path 24 to the second return flow path 31 in the first crystallization treatment mode. Furthermore, the controller 13 controls the valves 30, 34 to stop the water flow from the first flow path 22 to the first return flow path 26 with allowing the flow of water from the second flow path 24 to the second return flow path 31 in the second crystallization treatment mode.

As described above, the first return flow path 26 and the second return flow path 31 are provided to form a circulation flow path, and alkaline water is circulated through the circulation flow path in both the first mode and the second mode. According to the control, metal ions can be removed by the fine bubbles while increasing the pH value of the water flowing through the circulation flow path. As a result, crystallization of the metal ions removed by the fine bubbles can be enhanced, and removing effects of the metal ions can be enhanced.

According to the ion removal system 2 of the first embodiment, the controller 13 controls the valve 18 to stop water flow in the branch flow path 36 in the first crystallization treatment mode and the second crystallization treatment mode. The controller 13 further performs a treated water supply mode (third mode) for controlling the valve 18 to allow water to flow through the branch flow path 36 as a different mode from the first crystallization treatment mode and the second crystallization treatment mode.

According to the control, allowing the treated water to flow through the branch flow path 36 makes it possible to use the treated water in the water faucet 52.

<Water Softening Treatment (Removal Treatment of Metal Ions)>

The principle of the metal ion removal treatment using the above-described fine bubbles, that is, the "water softening treatment" will be described in more detail.

It is presumed that when the fine bubbles containing air are supplied into hard water, an action as described in the following sections (1) and (2) occurs on metal ions in hard water. Specifically, it is presumed that the metal ions in hard water can be adsorbed to the fine bubbles, and the adsorbed metal ions can be crystallized to remove the crystals of the metal component from hard water. More specifically, it is as follows. Note that the present invention is not limited to the specific principle described in the following sections (1) and (2).

(1) Adsorption of Metal Ions

Figure 7:
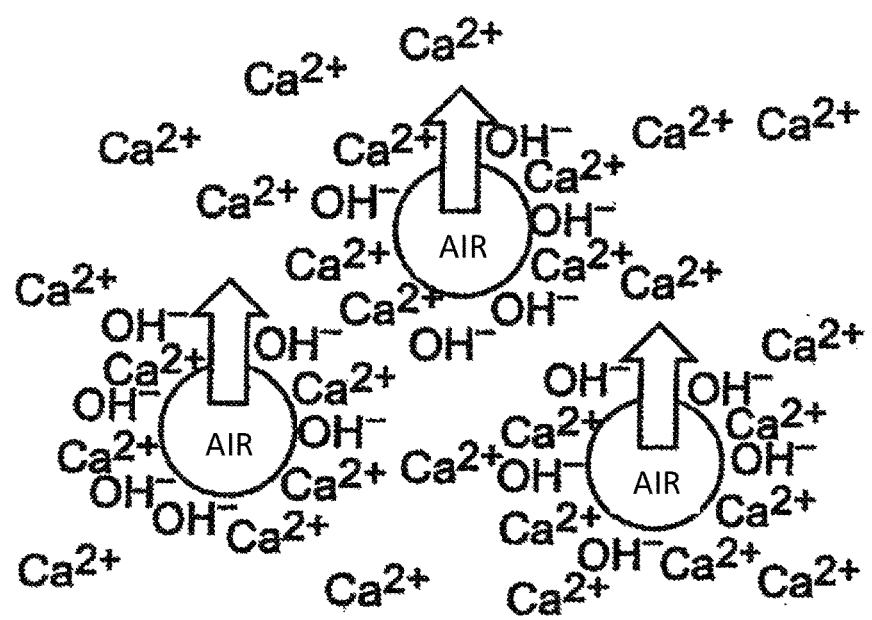
FIG. 7 is a schematic diagram for explaining a hypothetical principle of adsorption of metal ions by an ion removal device.

As illustrated in FIG. 7, when fine bubbles containing air are supplied into hard water, H+(hydrogen ions) and OH− (hydroxide ions) are mixed on the surfaces of the fine bubbles, H$^+$ is positively charged, and OH$^-$ is negatively charged (only OH$^-$ is illustrated in FIG. 7). On the other hand, in hard water, $Ca^{2+}$ and $Mg^{2+}$ exist as positively charged metal ions. In the following description, $Ca^{2+}$ will be described as an example of the metal ion.

The positively charged $Ca^{2+}$ is adsorbed to OH$^-$ present on the surface of the fine bubble by the action of intermolecular force (interionic interaction). As described above, $Ca^{2+}$ can be adsorbed to the fine bubbles. Although H$^+$ repelling $Ca^{2+}$ exists on the surface of the fine bubble, it is considered that OH$^-$ acts preferentially to H$^+$ to adsorb $Ca^{2+}$.

(2) Crystallization of Metal Ions

Figure 8:
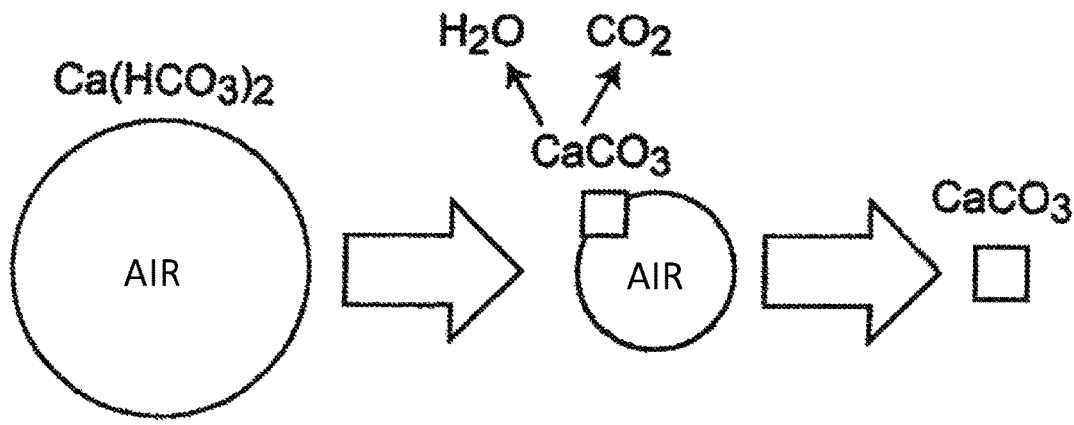
FIG. 8 is a schematic diagram for explaining a hypothetical principle of crystallization of metal ions by the ion removal device.

In addition to the reaction illustrated in FIG. 7, the reaction illustrated in FIG. 8 is promoted by supplying fine bubbles containing air into hard water. Specifically, the fine bubbles supplied into hard water are difficult to float unlike normal bubbles, and dissolve into hard water, so that the surface tension increases and gradually contracts as illustrated in FIG. 8. As described above, $Ca^{2+}$ is adsorbed on the surface of the fine bubble. More specifically, it is present as a calcium ion of soluble $Ca(HCO_3)_2$ (calcium hydrogen carbonate). As the fine bubble gradually contracts, the dissolved concentration of $Ca^{2+}$ on the surface of the fine bubble increases. An increase in the dissolution concentration causes supersaturation at a certain time point, and $Ca^{2+}$ is crystallized and precipitated. A specific chemical formula for this is as the following Formula 1.

$$Ca(HCO_3)_2 \rightarrow CaCO_3 + CO_2 + H_2O \quad \text{(Formula 1)}$$

$CaCO_3$ (calcium carbonate) is insoluble (water-insoluble) and thus precipitates as crystals of metal component. As a result, $Ca(HCO_3)_2$ dissolved as $Ca^{2+}$ is precipitated as crystals of the metal component. By promoting such a reaction, it is possible to separate $CaCO_3$ precipitated by crystallizing $Ca^{2+}$ of a metal ion from hard water.

Although a reaction in a direction opposite to Formula 1 may occur in the same water, it is presumed that the reaction in the direction of Formula 1 is preferentially performed in the equilibrium relationship by continuously supplying the fine bubbles. Since the reaction in the opposite direction of Formula 1 is basically a reaction that does not occur unless $CO_2$ gas is blown from the outside, it is considered that the reaction in the direction of Formula 1 preferentially occurs.

In the first embodiment, air is used as the gas of the fine bubbles in the water softening treatment, but the present invention is not limited to such a case. As the gas of the fine bubbles, for example, nitrogen may be used instead of air. It is presumed that by generating nitrogen fine bubbles from the fine bubble generation devices 10A, 10B and supplying the nitrogen fine bubbles into hard water, in addition to the effects of "(1) Adsorption of metal ions" and "(2) Crystallization of metal ions" described above, the effects as described in the following sections (3) and (4) are promoted. Note that the present invention is not limited to the specific principle described in the following sections (3) and (4).

(3) Promotion of Metal Ion Adsorption

Figure 9:
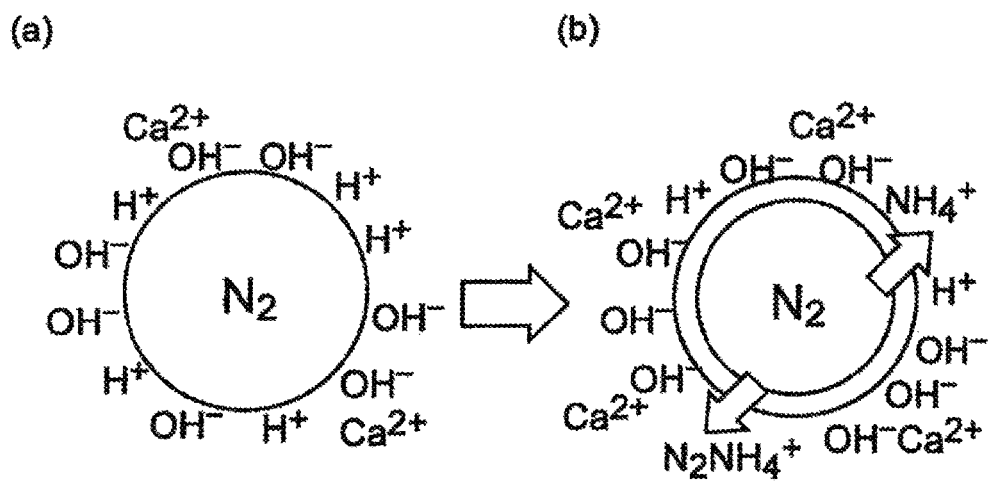
FIG. 9 is a schematic diagram for explaining a hypothetical principle of adsorption of metal ions by the ion removal device.

As illustrated in FIG. 9(a), H$^+$ and OH$^-$ are charged around the fine bubbles. As described above, positively charged $Ca^{2+}$ is adsorbed to negatively charged OH$^-$. Under such circumstances, when nitrogen is used as the fine bubbles, the reaction of the following Formula 2 is promoted.

$$N_2 + 6H^+ + 6e^- \rightarrow 2NH_3$$

$$NH_3 + H_2O \rightarrow NH_4^+ + OH^- \quad \text{(Formula 2)}$$

As the reaction of Formula 2 is promoted, the number of H$^+$ ions decreases with respect to the number of OH$^-$ ions as illustrated in FIG. 9(b). As a result, a negative charge becomes strong as fine bubbles, and $Ca^{2+}$ having a positive charge is easily adsorbed.

In the case of using nitrogen as in the present modification, the reaction of Formula 2 can be promoted as compared with the case of using air, so that the adsorption of metal ions is further promoted. This makes it possible to separate and remove more metal ions from hard water.

The above principle is not limited to nitrogen, and it is presumed that the same applies to a gas that reacts with H$^+$ ions and can reduce the number of H$^+$ ions with respect to the number of OH$^-$ ions.

(4) Enhancement of Metal Ion Crystallization

Since nitrogen is an inert gas different from air, when nitrogen is supplied into hard water, the balance of partial pressures of gases contained in hard water is lost. As a result, the reaction as illustrated in FIG. 10 is promoted.

Figure 10:
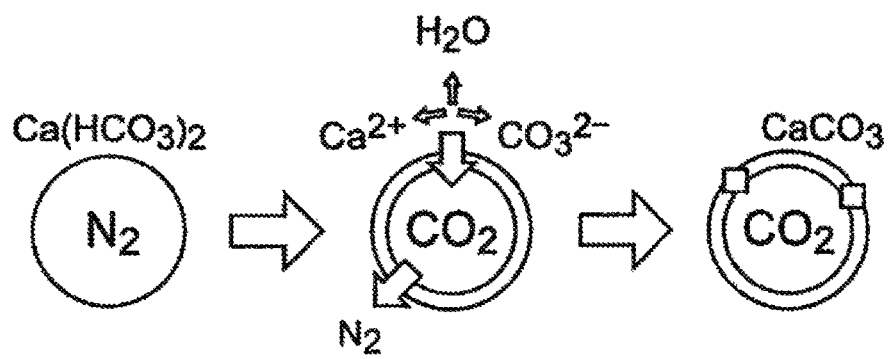
FIG. 10 is a schematic diagram for explaining a hypothetical principle of crystallization of metal ions by the ion removal device.

As illustrated in FIG. 10, other gas components dissolved in hard water act to replace the fine bubbles composed of nitrogen. In the example illustrated in FIG. 10, $CO_2$ is contained in $Ca(HCO_3)_2$ existing around the fine bubbles, and this $CO_2$ is extracted and acts to replace nitrogen. That is, the following reaction is promoted.

$$Ca(HCO_3)_2 \rightarrow CaCO_3 + CO_2 + H_2O \quad \text{(Formula 3)}$$

A reaction in which insoluble $CaCO_3$ is generated from soluble $Ca(HCO_3)_2$ occurs as described above. At this time, $CO_2$ and $H_2O$ are generated. Since $CaCO_3$ is insoluble, it precipitates as a crystal of metal component.

By the reaction, metal ions contained as $Ca^{2+}$ of $Ca(HCO_3)_2$ in hard water can be crystallized and precipitated. As a result, the crystal of the metal component can be removed from hard water.

The above principle is not limited to nitrogen, and it is presumed that the same applies to a gas other than air that unbalances the partial pressure of a gas dissolved in hard water.

As described above, by incorporating nitrogen to generate fine bubbles and supplying the bubbles to hard water, the reactions described in the sections of "(3) Promotion of metal ion adsorption" and "(4) Enhancement of metal ion crystallization" can be promoted, as compared with the case of using air. This makes it possible to improve the accuracy of removing metal ions from hard water.

In the above description, $Ca^{2+}$ has been described as an example of the metal ion, but it is presumed that a similar reaction also occurs for $Mg^{2+}$.

Second Embodiment

An ion removal system according to a second embodiment of the present invention will be described. In the second embodiment, points different from the first embodiment will be mainly described, and description overlapping with the first embodiment will be omitted.

The second embodiment is different from the first embodiment in that fine carbon dioxide bubbles can be supplied to the first flow path 22, the second flow path 24, and the third flow path 38.

Figure 11:
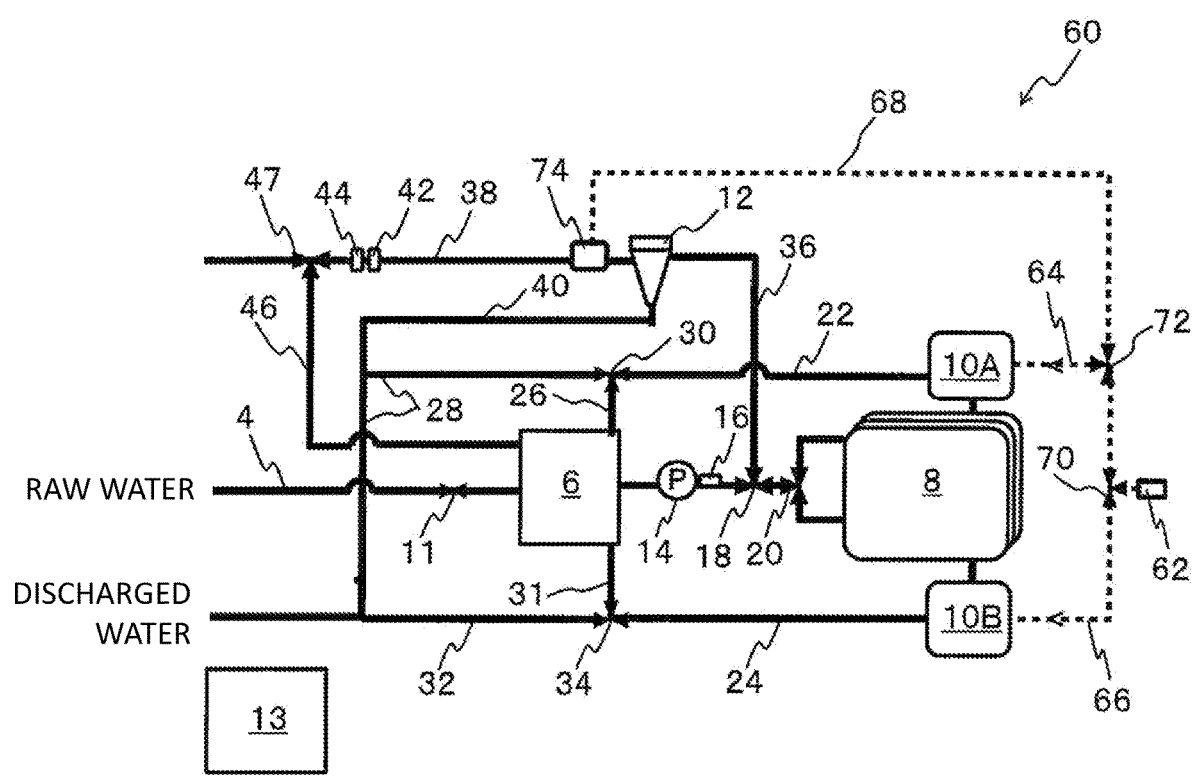
FIG. 11 is a schematic diagram of an ion removal system according to a second embodiment.

FIG. 11 is a schematic diagram of an ion removal system 60 in the second embodiment.

The ion removal system 60 of the second embodiment illustrated in FIG. 11 includes a carbon dioxide input device 62, supply flow paths 64, 66, 68, valves 70, 72, and a fine bubble generation device 74.

The carbon dioxide input device 62 is a device capable of inputting carbon dioxide into the supply flow paths 64, 66, 68. The carbon dioxide input device 62 itself may be a tank that contains carbon dioxide or a device connected to a supply source of carbon dioxide (not illustrated).

The supply flow paths 64, 66, 68 are flow paths connected from the carbon dioxide input device 62 to the fine bubble generation devices 10A, 10B, 74, respectively.

The valve 70 is a valve for controlling the flow rate of carbon dioxide supplied from the carbon dioxide input device 62 (an electric valve in the second embodiment). The valve 72 is a valve for controlling the flow rate of carbon dioxide supplied from the carbon dioxide input device 62 to the supply flow path 64 or the supply flow path 68 (an electric valve in the second embodiment).

The fine bubble generation device 74 is a device that generates carbon dioxide supplied from the supply flow path 68 as fine bubbles. The fine bubble generation device 74 is connected to the third flow path 38 so as to supply fine bubbles of carbon dioxide to the third flow path 38.

According to the configuration, fine carbon dioxide bubbles can be supplied to the first flow path 22, the second flow path 24, and the third flow path 38. In the cleaning mode and the like described in the section of the first embodiment, the flow path can be more effectively cleaned by supplying fine bubbles of carbon dioxide when cleaning the flow path with acid water.

<Regeneration Treatment (Cleaning Treatment)>

The principle of the cleaning treatment of the flow path by the fine bubbles of carbon dioxide, that is, the "regeneration treatment" will be described in detail.

By performing the water softening treatment, part of $CaCO_3$ precipitated by crystallizing metal ions is attached to the inner wall surface of the flow path. As a process for returning this $CaCO_3$ to $Ca(HCO_3)_2$, a regeneration treatment is performed.

Figure 12:
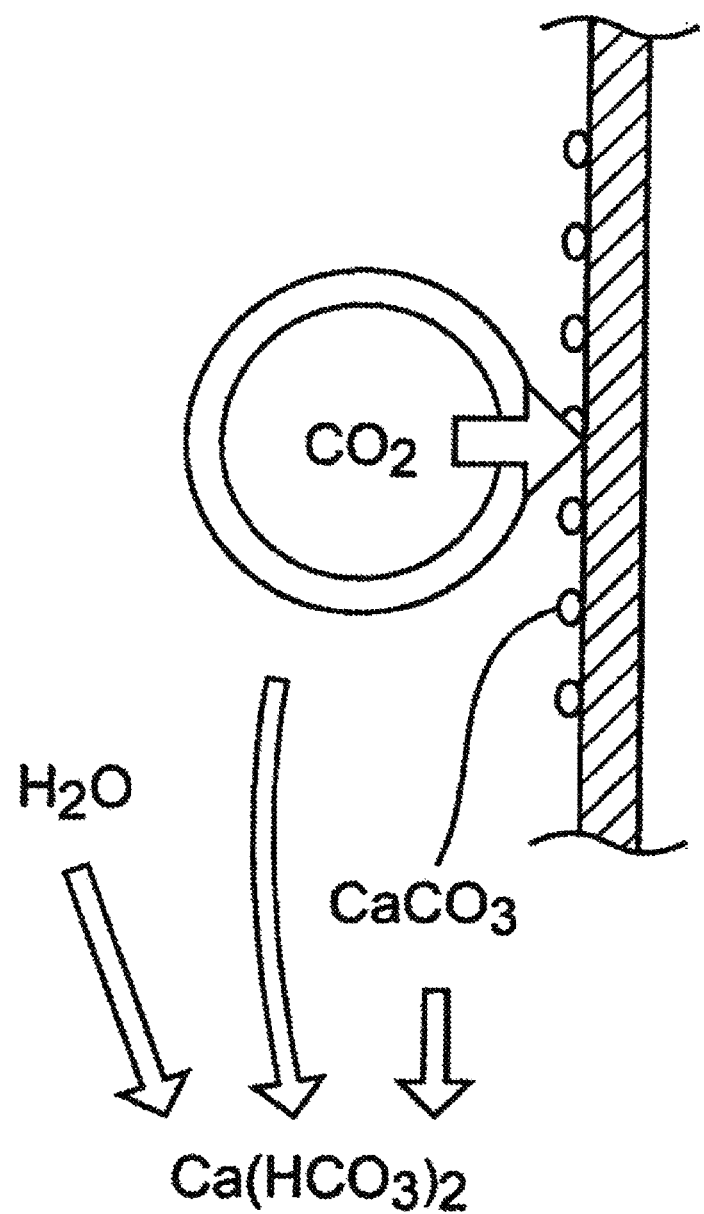
FIG. 12 is a schematic diagram for explaining a hypothetical principle of regeneration processing by the ion removal device.

As illustrated in FIG. 12, the following reaction is promoted by supplying fine carbon dioxide bubbles to $CaCO_3$ attached to the inner wall surface of the flow path.

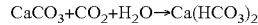

$$CaCO_3 + CO_2 + H_2O \rightarrow Ca(HCO_3)_2 \qquad \text{(Formula 4)}$$

Soluble (water-soluble) $Ca(HCO_3)_2$ is generated from insoluble $CaCO_3$ by the reaction. $Ca(HCO_3)_2$ dissolves into water. As a result, insoluble $CaCO_3$ attached to the inner wall surface of the flow path can be discharged to the outside and returned to the original state.

In the second embodiment described above, the case where fine carbon dioxide bubbles can be supplied to the first flow path 22, the second flow path 24, and the third flow path 38 has been described, but the present invention is not limited to such a case. For example, the supply flow path 68 and the fine bubble generation device 74 illustrated in FIG. 11 may be omitted, and fine bubbles of carbon dioxide may be supplied only to the first flow path 22 and the second flow path 24.

Third Embodiment

An ion removal system according to a third embodiment of the present invention will be described. In the third embodiment, points different from the first embodiment will be mainly described, and description overlapping with the first embodiment will be omitted.

Figure 13:
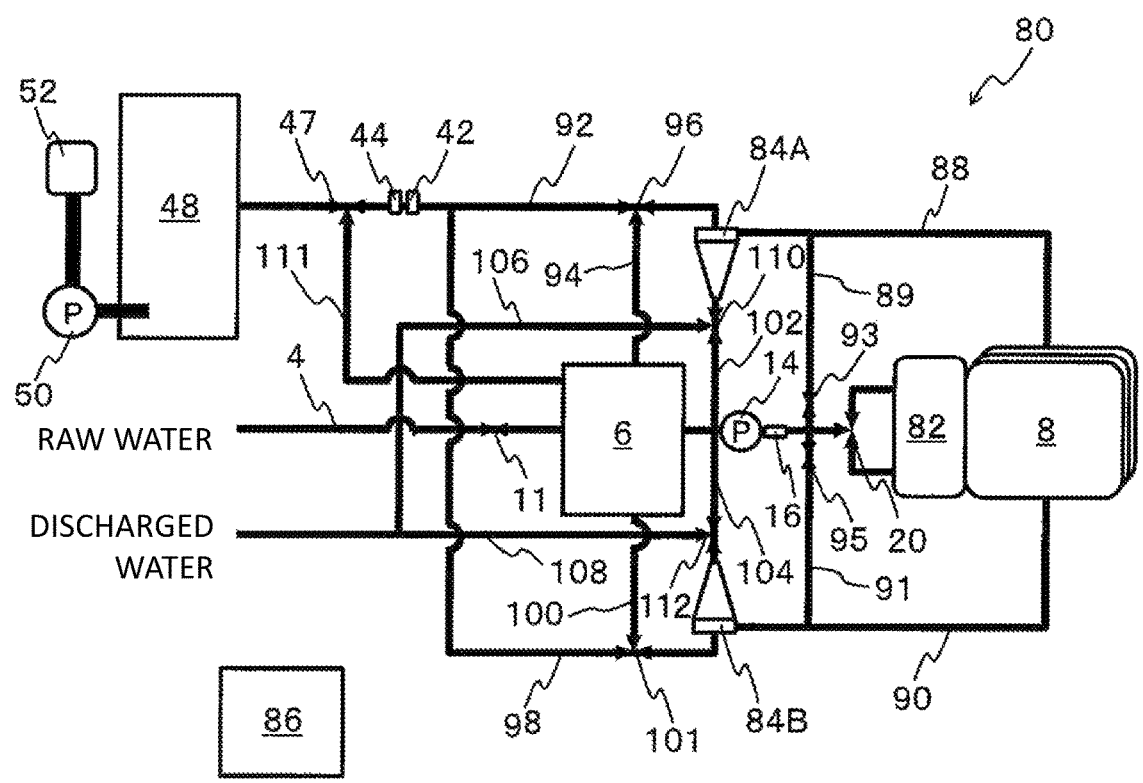
FIG. 13 is a schematic diagram of an ion removal system according to a third embodiment.

An ion removal system 80 of the third embodiment illustrated in FIG. 13 includes the hard water flow path 4, the batch treatment tank 6, a fine bubble generation device 82, the electrolysis device 8, separation devices 84A, 84B, and a controller 86.

The fine bubble generation device 82 is a device that generates fine bubbles in hard water supplied from the hard water flow path 4. The fine bubble generation device 82 of the third embodiment is provided on the upstream side of the electrolysis device 8.

The hard water flow path 4 is branched into two flow paths at a portion where the hard water flow path 4 is connected to the fine bubble generation device 82. These flow paths correspond to a first flow path 88 and a second flow path 90 described later, respectively.

The first flow path 88 and the second flow path 90 are connected to the downstream side of the electrolysis device 8. The first flow path 88 and the second flow path 90 are flow paths through which alkaline water and acid water generated by the electrolysis device 8 can alternately flow.

A branch flow path 89 is connected to the middle of the first flow path 88. As similar to this, a branch flow path 91 is connected to the middle of the second flow path 90.

The branch flow path 89 is a flow path connected between the first flow path 88 and the hard water flow path 4. The branch flow path 91 is a flow path connected between the second flow path 90 and the hard water flow path 4. Both of the branch flow paths 89 and 91 are connected to a position between the batch treatment tank 6 and the fine bubble generation device 82 in the hard water flow path 4.

Valves 93, 95 are provided in the middle of the branch flow paths 89, 91, respectively. The valves 93, 95 are valves for switching between allowing and stopping water flow in the branch flow paths 89, 91, respectively (solenoid valves in the third embodiment).

The separation device 84A is connected to the downstream side of the first flow path 88. As similar to this, the separation device 84B is connected to the downstream side of the second flow path 90. The separation devices 84A, 84B are devices that centrifuge crystals of metal components flowing in water.

A third flow path 92 is connected to the separation device 84. The third flow path 92 is a flow path through which the treated water from which crystals have been separated by the separation device 84A flows. A first return flow path 94 is connected to the middle of the third flow path 92. The first return flow path 94 is a flow path connected from the third flow path 92 to the batch treatment tank 6. A valve 96 is provided at a position where the first return flow path 94 is connected to the third flow path 92 (an electric valve in the third embodiment).

As similar to this, the fourth flow path 98 is connected to the separation device 84B. The fourth flow path 98 is a flow path through which the treated water from which crystals have been separated by the separation device 84B flows. A second return flow path 100 is connected to the middle of the fourth flow path 98. The second return flow path 100 is a flow path connected from the fourth flow path 98 to the batch treatment tank 6. A valve 101 is provided at a position where the second return flow path 100 is connected to the fourth flow path 98 (an electric valve in the third embodiment).

A third return flow path 102 and a fourth return flow path 104 are further connected to the separation devices 84A, 84B, respectively. The third return flow path 102 is a flow path connected from the separation device 84A to the hard water flow path 4, and the fourth return flow path 104 is a flow path connected from the separation device 84B to the hard water flow path 4. The third return flow path 102 is a flow path through which water containing crystals of the metal component separated by the separation device 84A flows, and the fourth return flow path 104 is a flow path through which water containing crystals of the metal component separated by the separation device 84B flows.

Both the third return flow path 102 and the fourth return flow path 104 are connected to the hard water flow path 4 at a position between the batch treatment tank 6 and the pump 14. The connection point at which the third return flow path 102 and the fourth return flow path 104 are connected to the hard water flow path 4 is located downstream of the batch treatment tank 6 and upstream of the connection point at which the branch flow path 89 and the branch flow path 91 are connected to the hard water flow path 4.

A first discharge flow path 106 is connected to the middle of the third return flow path 102. As similar to this, the second discharge flow path 108 is connected to the middle of fourth return flow path 104. The first discharge flow path 106 and the second discharge flow path 108 are flow paths extending outside the system of the ion removal system 80 without flowing through the batch treatment tank 6.

A valve 110 is provided at a position where the first discharge flow path 106 is connected to the third return flow path 102 (an electric valve in the third embodiment). As similar to this, a valve 112 is provided at a position where the second discharge flow path 108 is connected to the fourth return flow path 104 (an electric valve in the third embodiment).

As illustrated in FIG. 13, the pH sensor 42 and the turbidity sensor 44 are provided in the middle of the third flow path 92. A fifth return flow path 111 is further connected to the middle of the third flow path 92. A valve 47 is provided at a position where the fifth return flow path 111 is connected to the third flow path 92 (an electric valve in the third embodiment).

The controller 86 operates the ion removal system 80 having the above-described configuration in a plurality of operation modes. These operation modes will be described.

(Raw Water Injection Mode)

A raw water injection mode is a mode in which hard water as raw water is injected into each flow path when the operation of the ion removal system 80 is started. Specifically, the controller 86 performs control to generate a flow as illustrated in FIGS. 14A and 14B.

Figure 14A:
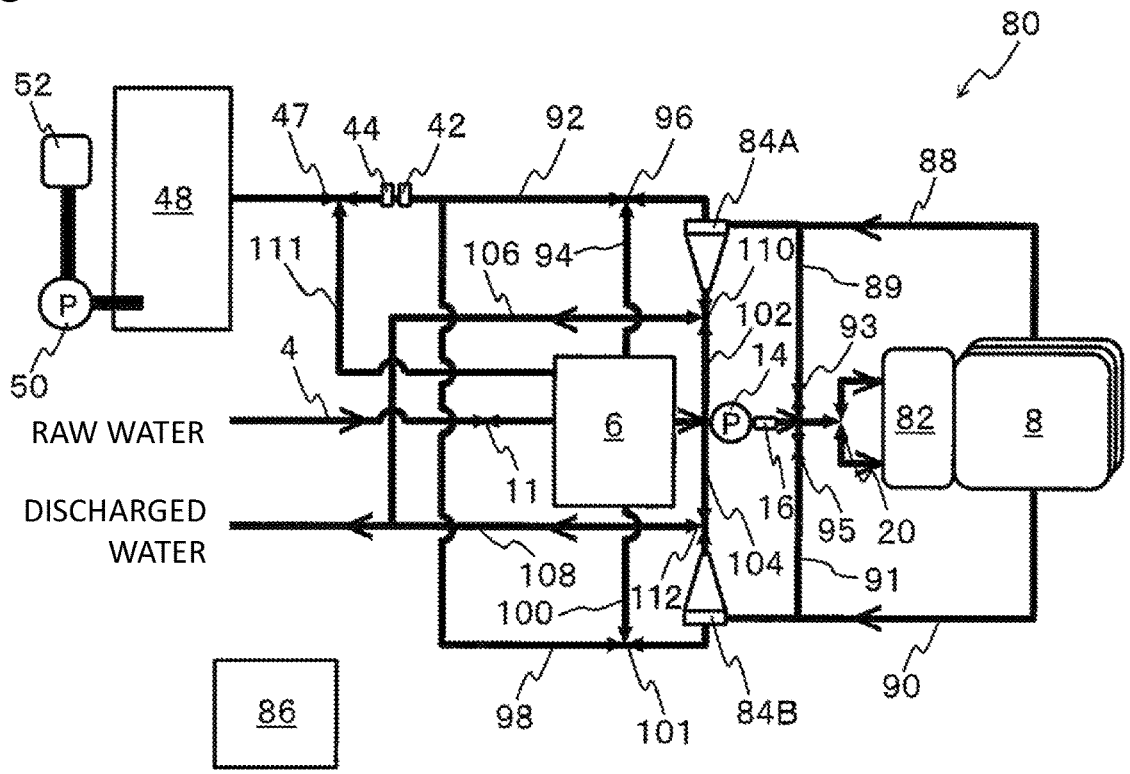
FIG. 14A is a diagram illustrating water flow in a first stage of a raw water injection mode in a third embodiment.

FIG. 14A illustrates a mode for discharging residual water remaining in the flow path as a first stage of the raw water injection mode. As illustrated in FIG. 14A, the controller 86 opens the valve 11 so as to allow hard water to flow through the hard water flow path 4, and drives the pump 14 so as to supply the hard water in the batch treatment tank 6 to the electrolysis device 8. The controller 86 controls opening and closing of the valves 93, 95 so that water is not allowed to flow from the hard water flow path 4 to the branch flow paths 89, 91. The controller 86 further performs control so that hard water flowing through the hard water flow path 4 is allowed to directly flow through the first flow path 88 and the second flow path 90 without operating the electrolysis device 8. The controller 86 further controls opening and closing of the valve 110 such that hard water that has been allowed to flow through the first flow path 88 is allowed to flow through the first discharge flow path 106 from the separation device 84A, and controls opening and closing of the valve 112 such that hard water that has allowed to flow through the second flow path 90 is allowed to flow through the second discharge flow path 108 from the separation device 84B. As a result, a flow of arrows as illustrated in FIG. 14A is generated, and residual water remaining in each flow path is drained.

Figure 14B:
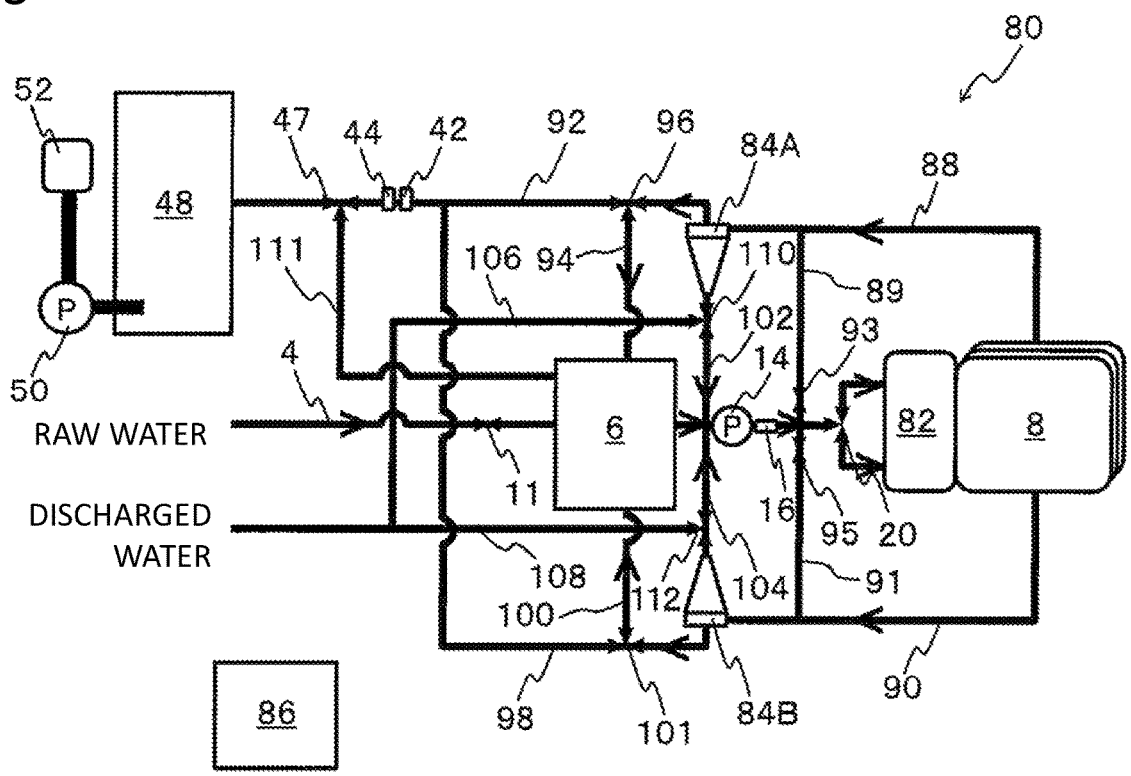
FIG. 14B is a diagram illustrating water flow in a second stage of the raw water injection mode in the third embodiment.

FIG. 14B illustrates a mode for injecting new hard water into the batch treatment tank 6 as a second stage of the raw water injection mode. The controller 86 changes the opening and closing of the valves 96, 101, 110, 112 from the state illustrated in FIG. 14A. Specifically, the valves 96, 110 are controlled such that hard water allowed to flow through the first flow path 88 is allowed to flow from the separation device 84A to both the first return flow path 94 and the third return flow path 102. As similar to this, the valves 101, 112 are controlled such that hard water allowed to flow through the second flow path 90 is allowed to flow through both the second return flow path 100 and the fourth return flow path 104 from the separation device 84B. As a result, a flow of arrows as illustrated in FIG. 14B is generated, and new hard water is injected into the batch treatment tank 6.

By driving the separation devices 84A, 84B, hard water from which crystals of the metal component are separated is supplied to the batch treatment tank 6, and hard water containing crystals of the metal component is supplied to the hard water flow path 4 on the side downstream of the batch treatment tank 6.

After the raw water injection mode described above is performed, a first crystallization treatment mode or a second crystallization treatment mode described below is performed.

(First Crystallization Treatment Mode (First Mode))

Figure 15A:
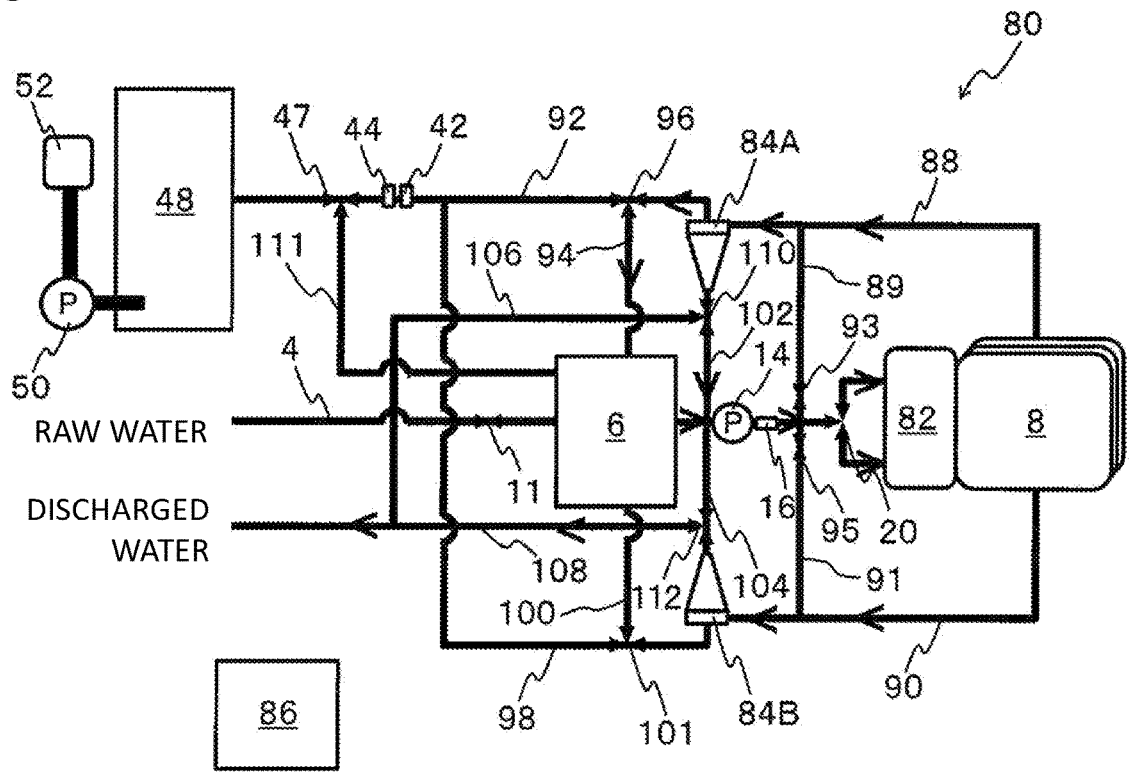
FIG. 15A is a diagram illustrating water flow in a first crystallization treatment mode in the third embodiment.

FIG. 15A illustrates a first crystallization treatment mode. The controller 86 closes the valve 11 and drives the pump 14 so as to supply hard water contained in the batch treatment tank 6 to the fine bubble generation device 82 and the electrolysis device 8. The controller 86 further drives the electrolysis device 8 to generate alkaline water and acid water.

Among the alkaline water and the acid water generated by the electrolysis device 8, in the first crystallization treatment mode, the controller 86 controls the electrolysis device 8 so that the alkaline water is allowed to flow through the first flow path 88 and the acid water is allowed to flow through the second flow path 90.

Fine bubbles are supplied to the alkaline water and the acid water by the fine bubble generation device 82 provided on the upstream side of the electrolysis device 8. By the supply of the fine bubbles, particularly metal ions contained in the alkaline water allowed to flow through the first flow path 88 are adsorbed to the fine bubbles, and are sent to the separation device 84A in a state of being precipitated as crystals of the metal component.

The controller 86 drives the separation device 84A. The separation device 84A separates crystals of metal component contained in the treated water. The separation device 84A is controlled so as to supply the treated water from which the crystals have been separated to the first return flow path 94 via the third flow path 92 and to supply the treated water containing the crystals to the third return flow path 102. According to the control, the treated water from which the crystals have been separated is stored in the batch treatment tank 6, and the treated water containing the crystals is returned to the hard water flow path 4 on the side downstream of the batch treatment tank 6. As a result, a flow of arrows as illustrated in FIG. 15A is generated.

In the flow illustrated in FIG. 15A, a circulation flow path through which alkaline water flows in a loop in the order of the batch treatment tank 6, the electrolysis device 8, the first flow path 88, and the first return flow path 94 is formed. In the circulation flow path, the treated water from which the crystals of the metal component have been separated is allowed to flow through the first return flow path 94. Therefore, in the treated water stored in the batch treatment tank 6, the proportion of crystals of the metal component decreases. As a circulation flow path different from the circulation flow path, a circulation flow path through which alkaline water flows in a loop in the order of the batch treatment tank 6, the electrolysis device 8, the first flow path 88, and the third return flow path 102 is formed. In the circulation path, treated water containing crystals of metal component is allowed to flow through the third return flow path 102.

According to the above control, by storing the treated water from which the crystals of the metal component have been separated in the batch treatment tank 6, the ratio of the crystals of the metal component contained in the treated water in the batch treatment tank 6 can be reduced. On the other hand, the alkaline water containing the crystal of the metal component is circulated in the circulation flow path excluding the batch treatment tank 6, so that the crystallization of the metal component can be promoted by newly attaching the crystal to the crystal of the metal component.

The acid water allowed to flow through the second flow path 90 is discharged from the separation device 84B to the outside of the system of the ion removal system 2 via the second discharge flow path 108.

(Second Crystallization Treatment Mode (Second Mode))

Figure 15B:
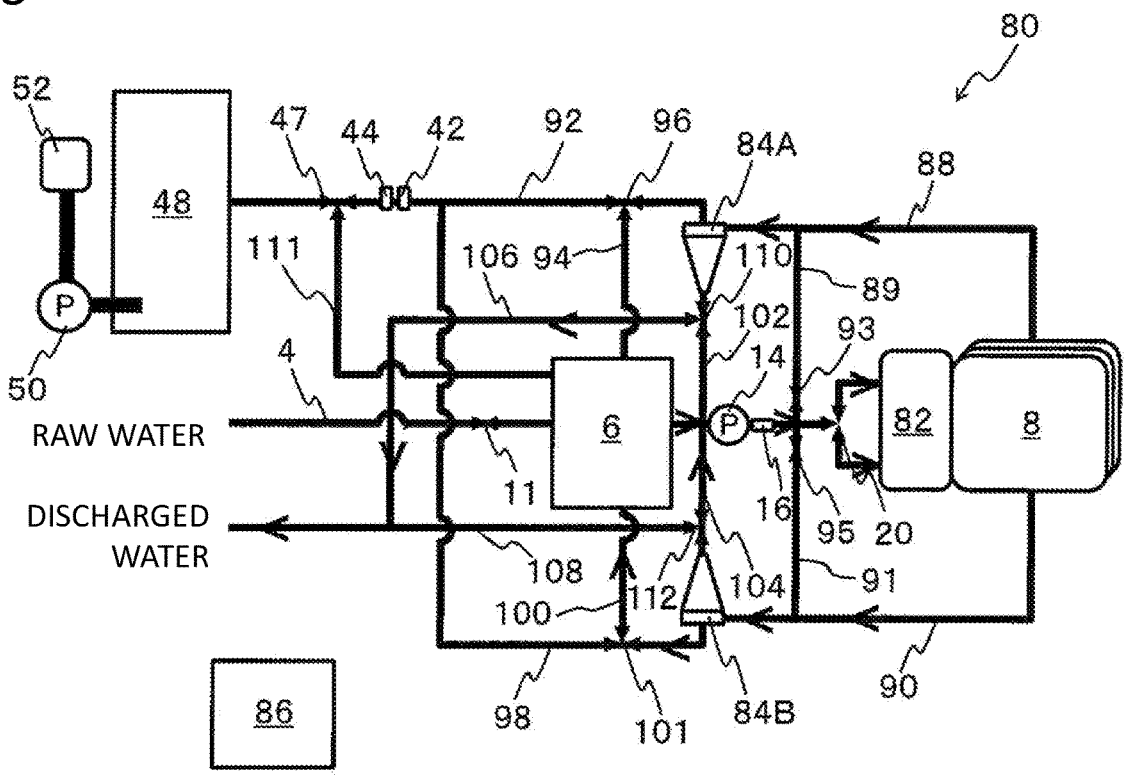
FIG. 15B is a diagram illustrating water flow in a second crystallization treatment mode in the third embodiment.

FIG. 15B illustrates the second crystallization treatment mode. In the second crystallization treatment mode, unlike the first crystallization treatment mode illustrated in FIG. 15A, the electrolysis device 8 is controlled such that, among the alkaline water and the acid water generated by the electrolysis device 8, the acid water is allowed to flow through the first flow path 88 and the alkaline water is allowed to flow through the second flow path 90.

Fine bubbles are supplied to the alkaline water and the acid water by the fine bubble generation device 82 provided on the upstream side of the electrolysis device 8. By the supply of the fine bubbles, particularly metal ions contained in the alkaline water allowed to flow through the second flow path 90 are adsorbed to the fine bubbles, and are sent to the separation device 84B in a state of being precipitated as crystals of the metal component.

The controller 86 drives the separation device 84B to separate crystals of the metal component contained in the treated water. The separation device 84B is controlled so as to supply the treated water from which the crystals have been separated to the second return flow path 100 via the fourth flow path 98 and to supply the treated water containing the crystals to the fourth return flow path 104. According to the control, the treated water from which the crystals have been separated is stored in the batch treatment tank 6, and the treated water containing the crystals is returned to the hard water flow path 4 on the side downstream of the batch treatment tank 6. As a result, a flow of arrows as illustrated in FIG. 15B is generated.

In the flow illustrated in FIG. 15B, a circulation flow path through which alkaline water flows in a loop in the order of the batch treatment tank 6, the electrolysis device 8, the second flow path 90, and the second return flow path 100 is formed. In the circulation flow path, the treated water from which the crystals of the metal component have been separated in the second return flow path 100 is allowed to flow. Therefore, in the treated water stored in the batch treatment tank 6, the proportion of crystals of the metal component decreases. As a circulation flow path different from the circulation flow path, a circulation flow path through which alkaline water flows in a loop in the order of the batch treatment tank 6, the electrolysis device 8, the second flow path 90, and the fourth return flow path 104 is formed. In the circulation path, treated water containing crystals of metal component is allowed to flow through the fourth return flow path 104.

According to the above control, while the treated water from which the crystals of the metal component have been separated is stored in the batch treatment tank 6, the treated water containing the crystals of the metal component is circulated in the circulation flow path excluding the batch treatment tank 6. As a result, the same effect as that of the first crystallization treatment mode can be achieved.

The acid water allowed to flow through the first flow path 88 is discharged to the outside of the system of the ion removal system 2 via the first discharge flow path 106.

After performing the first crystallization treatment mode or the second crystallization treatment mode described above, the controller 86 performs the first treated water supply mode or the second treated water supply mode described below. Specifically, the first treated water supply mode is performed after the first crystallization treatment mode, and the second treated water supply mode is performed after the second crystallization treatment mode.

(First Treated Water Supply Mode)

Figure 16A:
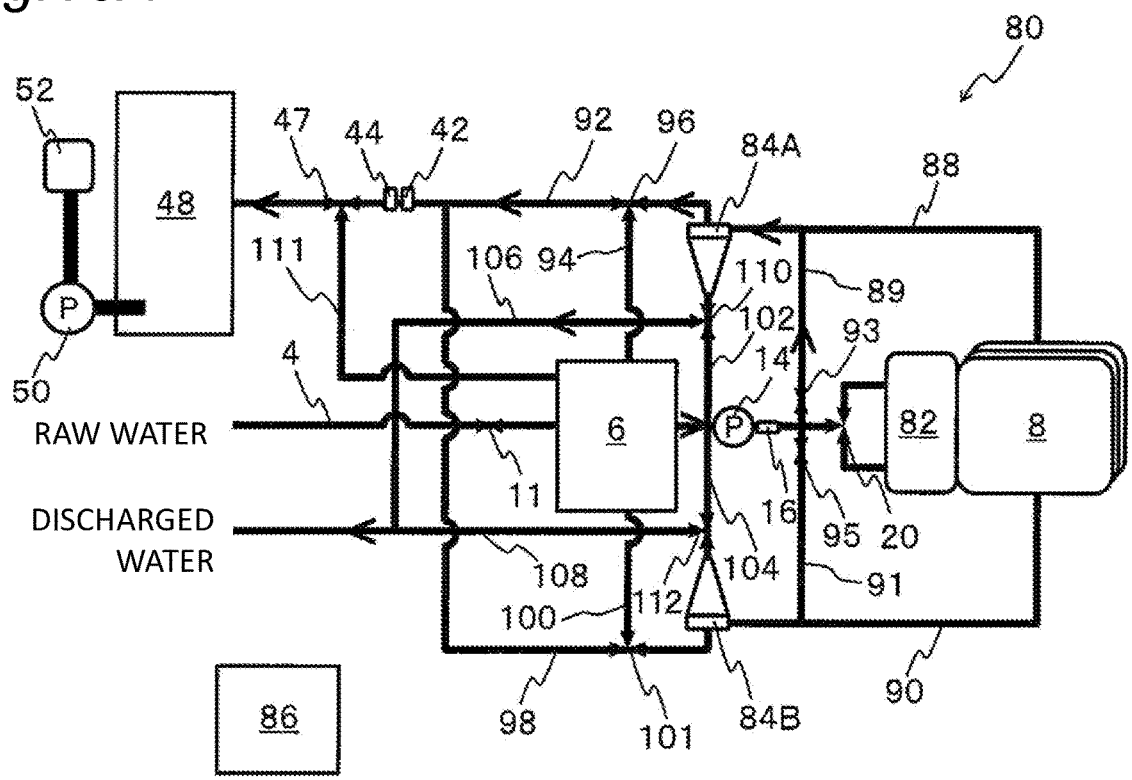
FIG. 16A is a diagram illustrating water flow in a first treated water supply mode in the third embodiment.

FIG. 16A illustrates a first treated water supply mode. The first treated water supply mode is an operation mode in which treated water obtained by treating hard water in the first crystallization treatment mode is supplied to the water faucet 52.

First, the controller 86 controls opening and closing of the valve 93 such that water is allowed to flow through the branch flow path 89. By driving the pump 14 in this state, the treated water stored in the batch treatment tank 6 is allowed to flow through the branch flow path 89. At this time, the controller 13 controls opening and closing of the valves 20, 95 so as to stop the flow to the fine bubble generation device 82 and the branch flow path 91.

The treated water that has been allowed to flow through the branch flow path 89 is sent to the separation device 84A. The separation device 84A separates crystals of metal component contained in the treated water. The separation device 84A supplies the treated water from which the crystals have been separated to the third flow path 92, and discharges the treated water containing the crystals through the first discharge flow path 106.

The treated water that has been allowed to flow through the third flow path 92 is stored in the water storage tank 48. Thereafter, by operating the pump 50, the treated water stored in the water storage tank 48, that is, soft water can be supplied to the water faucet 52 and used.

By separating the crystals of the metal component by the separation device 84A as described above, the ratio of the crystals of the metal component in the treated water supplied from the batch treatment tank 6 to the water faucet 52 can be further reduced.

(Second Treated Water Supply Mode)

Figure 16B:
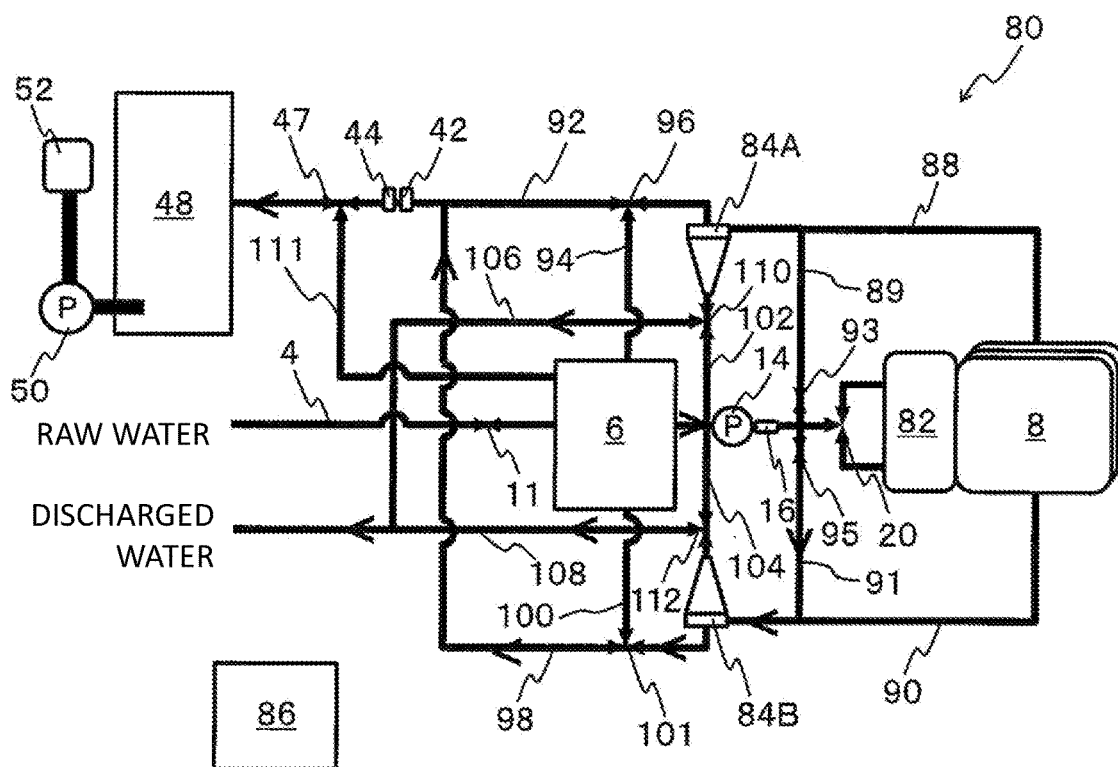
FIG. 16B is a diagram illustrating water flow in a second treated water supply mode in the third embodiment.

FIG. 16B illustrates a second treated water supply mode. The second treated water supply mode is an operation mode in which treated water obtained by treating hard water in the second crystallization treatment mode is supplied to the water faucet 52.

First, the controller 86 controls opening and closing of the valve 95 such that water is allowed to flow through the branch flow path 91. By driving the pump 14 in this state, the treated water stored in the batch treatment tank 6 is allowed to flow through the branch flow path 91. At this time, the controller 13 controls opening and closing of the valves 20, 93 so as to stop the flow to the fine bubble generation device 82 and the branch flow path 89.

The treated water that has been allowed to flow through the branch flow path 19 is sent to the separation device 84B. The separation device 84B separates crystals of metal component contained in the treated water. The separation device 84B is controlled so as to supply the treated water from which the crystals have been separated to the fourth flow path 98, and discharges the treated water containing the crystals through the second discharge flow path 108.

The treated water has been allowed to flow through the fourth flow path 98 is stored in water storage tank 48. Thereafter, by operating the pump 50, the treated water stored in the water storage tank 48, that is, soft water can be supplied to the water faucet 52 and used.

By separating the crystals of the metal component by the separation device 84B as described above, the ratio of the crystals of the metal component in the treated water supplied from the batch treatment tank 6 to the water faucet 52 can be further reduced.

The controller 86 alternately performs control of sequentially performing the raw water injection mode, the first crystallization treatment mode, and the first treated water supply mode described above, and control of sequentially performing the raw water injection mode, the second crystallization treatment mode, and the second treated water supply mode. By alternately performing the first crystallization treatment mode and the second crystallization treatment mode, the flow path through which the alkaline water has flowed can be cleaned with the acid water, and the flow path in the ion removal system 2 can be maintained in a state suitable for the metal ion removal treatment.

The controller 86 can perform a first cleaning mode, a second cleaning mode, and an abnormality-occurrence mode described below as modes different from the modes described above.

(First Cleaning Mode)

Figure 17A:
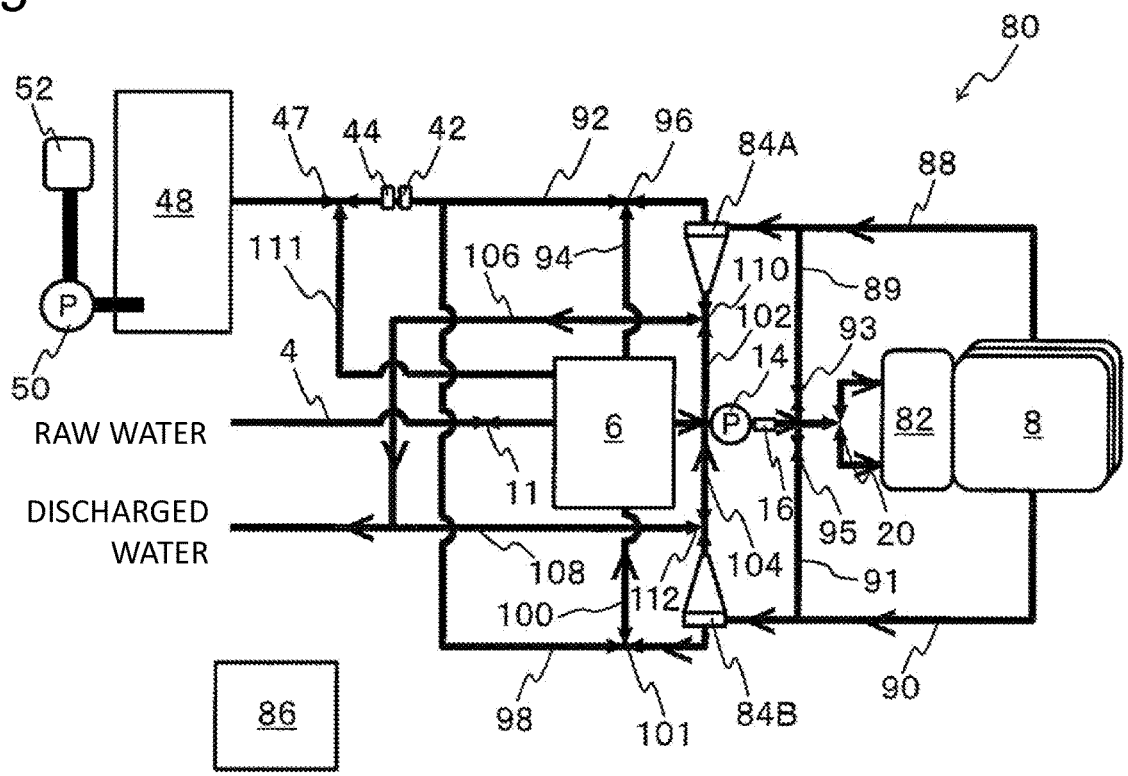
FIG. 17A is a diagram illustrating water flow in a first cleaning mode in the third embodiment.

FIG. 17A illustrates a first cleaning mode. The first cleaning mode illustrated in FIG. 17A generates the same flow as that in the second crystallization treatment mode illustrated in FIG. 15B. The first cleaning mode is different from the second crystallization treatment mode illustrated in FIG. 15B in that the electrolysis device 8 is controlled such that, among the alkaline water and the acid water generated by the electrolysis device 8, the alkaline water is allowed to flow through the first flow path 88 and the acid water is allowed to flow through the second flow path 90.

The acid water that has been allowed to flow through the second flow path 90 is allowed to flow through the fourth flow path 98 to the second return flow path 100 via the separation device 84B, and further flow through the fourth return flow path 104. By allowing the acid water to flow through the second return flow path 100 and the fourth return flow path 104 through which the acid water does not flow in the first crystallization treatment mode and the second crystallization treatment mode described above, these flow paths can be cleaned.

(Second Cleaning Mode)

Figure 17B:
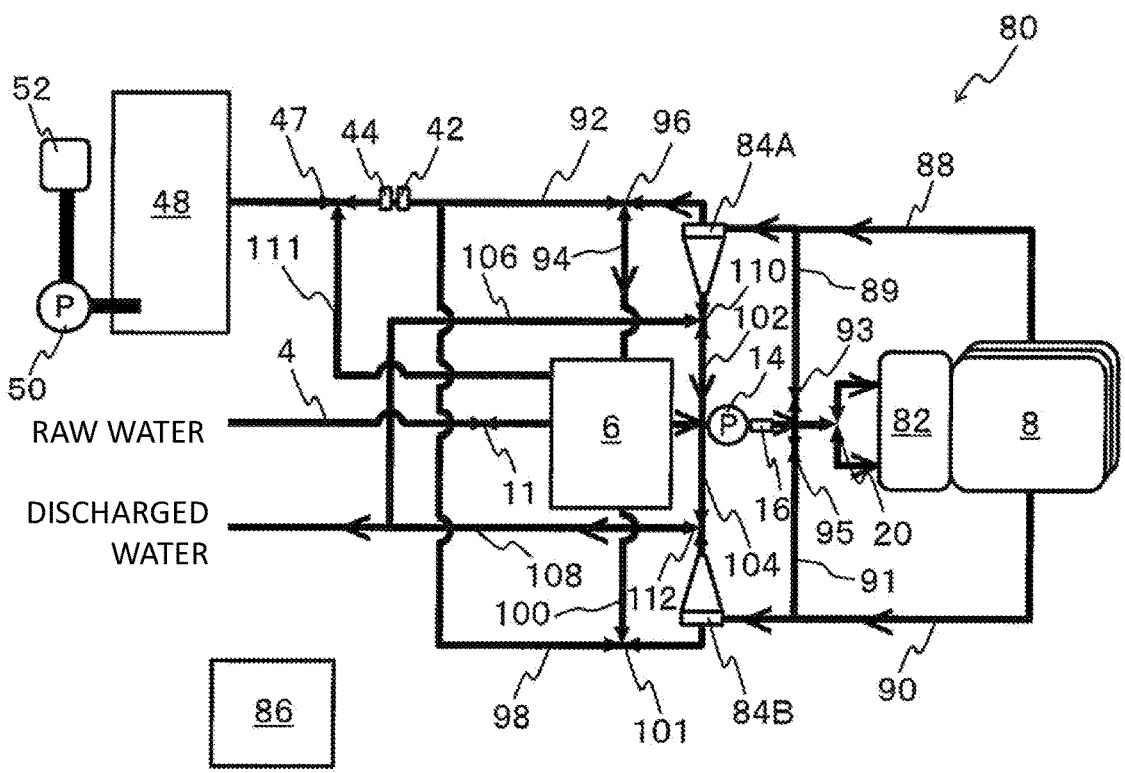
FIG. 17B is a diagram illustrating water flow in a second cleaning mode in the third embodiment.

FIG. 17B illustrates a second cleaning mode. The second cleaning mode illustrated in FIG. 17B generates the same flow as that in the first crystallization treatment mode illustrated in FIG. 15A. The second cleaning mode is different from the first crystallization treatment mode illustrated in FIG. 15A in that the electrolysis device 8 is controlled such that, among the alkaline water and the acid water generated by the electrolysis device 8, the acid water is allowed to flow through the first flow path 88 and the alkaline water is allowed to flow through the second flow path 90.

The acid water that has been allowed to flow through the first flow path 88 is allowed to flow through the third flow path 92 to the first return flow path 94 via the separation device 84B, and further flow through the third return flow path 102. By allowing the acid water to flow through the first return flow path 94 and the third return flow path 102 through which the acid water does not flow in the first crystallization treatment mode and the second crystallization treatment mode described above, these flow paths can be cleaned.

The first cleaning mode and the second cleaning mode described above may be performed at predetermined timing or any timing.

(Abnormality Occurrence Mode)

In the treated water supply mode illustrated in FIGS. 16A and 16B, the measurement values of the pH sensor 42 and the turbidity sensor 44 may be detected as abnormal values with respect to the treated water allowed to flow through the third flow path 92. In such a case, the abnormality occurrence mode described below is performed in order to stop the flow of the treated water to the water storage tank 48.

Figure 18:
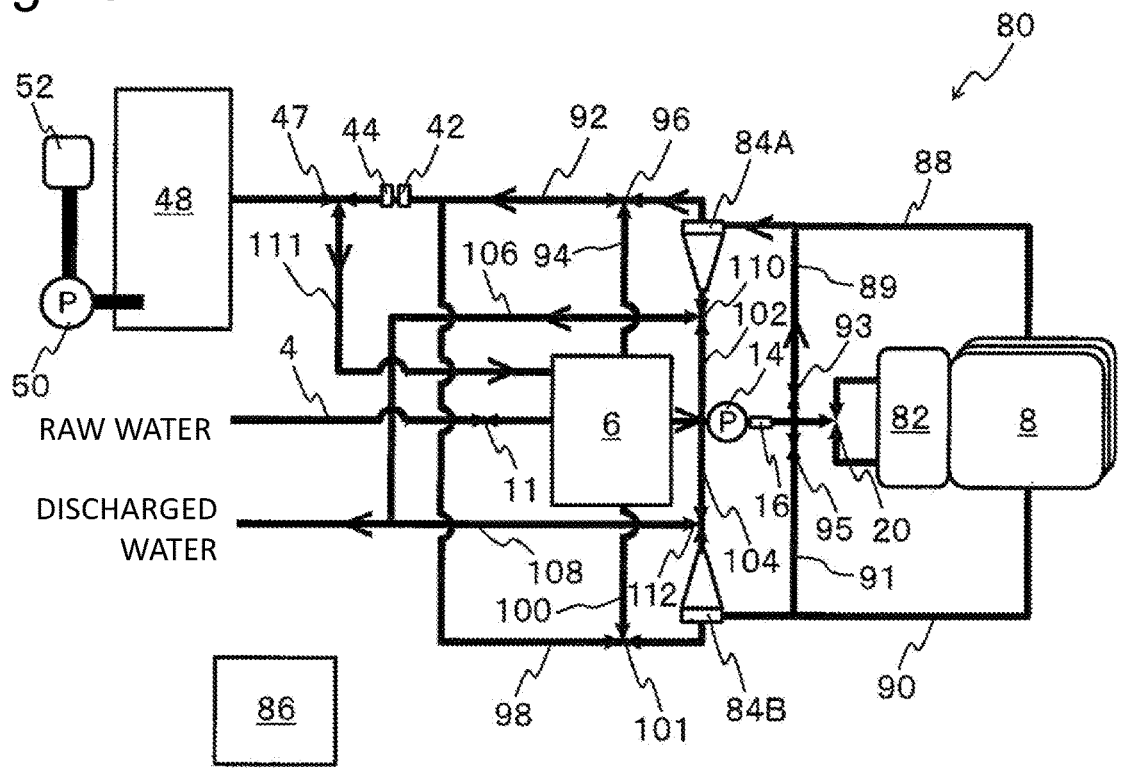
FIG. 18 is a diagram illustrating water flow in an abnormality occurrence mode in the third embodiment.

FIG. 18 illustrates the abnormality occurrence mode. The controller 86 changes the opening and closing control of the valve 47 from the treated water supply mode illustrated in FIG. 16A. Specifically, opening and closing of the valve 47 are controlled to stop water flow in the flow path from the third flow path 92 to the water storage tank 48 and to allow water flow from the third flow path 92 to the fifth return flow path 111. As a result, a flow of arrows as illustrated in FIG. 18 is generated.

By stopping the flow of water from the third flow path 92 to the water storage tank 48, it is possible to stop the supply of the treated water in which the abnormal value of the pH value or the turbidity is detected.

According to the ion removal system 80 of the second embodiment described above, it is possible to achieve the same operational effects as those of the ion removal system 2 of the first embodiment.

Fourth Embodiment

An ion removal system according to a fourth embodiment of the present invention will be described. In the fourth embodiment, points different from the first embodiment will be mainly described, and description overlapping with the first embodiment will be omitted.

The fourth embodiment is different from the first embodiment mainly in that the hard water flow path 4 is connected to the electrolysis device 8 by one flow path, that the valves 204, 206, 208, 210 can adjust the flow rate, and that debubbling devices 202A, 202B and an additive input device 212 are provided.

Figure 19:
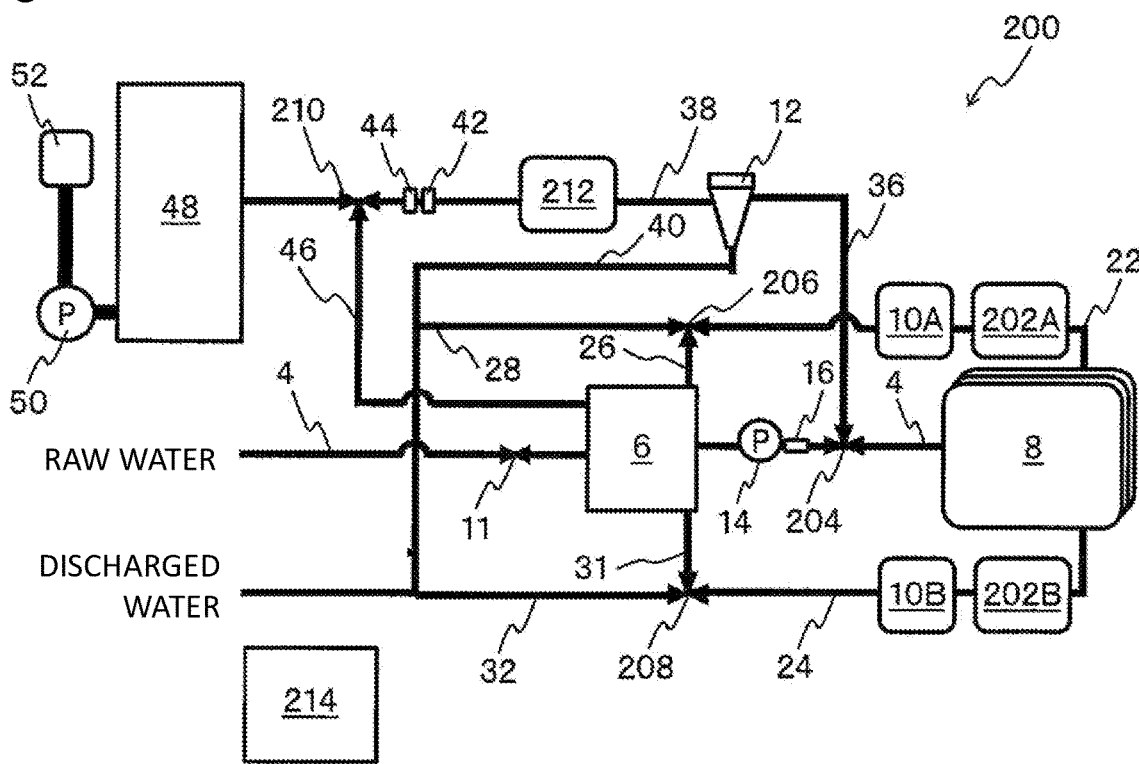
FIG. 19 is a schematic diagram of an ion removal system according to a fourth embodiment.

FIG. 19 is a schematic diagram of an ion removal system 200 according to the fourth embodiment.

The ion removal system 200 of the fourth embodiment illustrated in FIG. 19 includes debubbling devices 202A, 202B as a configuration different from that of the ion removal system 2 of the first embodiment.

The debubbling devices 202A, 202B are devices for discharging bubbles contained in water flowing through the first flow path 22 and the second flow path 24 to the outside, respectively. The debubbling devices 202A, 202B of the fourth embodiment perform centrifugal separation on water flowing through the first flow path 22 and the second flow path 24, respectively, to discharge bubbles to the outside. By discharging the bubbles by the debubbling devices 202A, 202B, the amount of bubbles contained in the water sent to the fine bubble generation devices 10A, 10B can be reduced.

When the electrolysis device 8 is operated, alkaline water and acid water are generated, and bubbles such as $H_2$ and $O_2$ are generated at the same time. When such water containing many bubbles is sent to the fine bubble generation devices 10A, 10B, the effect of bubble contraction by the fine bubbles described with reference to FIG. 8 and the like is hindered, and as a result, crystallization of metal ions may be hindered. On the other hand, by providing the debubbling devices 202A, 202B and discharging the bubbles in the first flow path 22 and the second flow path 24, the crystallization of metal ions by the fine bubbles can be promoted.

The ion removal system 200 of the fourth embodiment further includes valves 204, 206, 208, 210. The valves 204, 206, 208, 210 is an electric valve corresponding to the valves 18, 30, 34, 47 of the first embodiment, respectively (see FIG. 1 and the like). Each of the valves 204, 206, 208, 210 has a function of, in addition to a function of closing one flow path and opening another flow path, changing a flow rate by adjusting an opening degree of opening the another flow path.

According to such a flow rate adjusting function, the valve 204 can vary the flow rate of the hard water/treated water supplied from the batch treatment tank 6 to the electrolysis device 8, and similarly, can vary the flow rate of the treated water supplied from the hard water flow path 4 to the branch flow path 36. The same applies to the valves 206, 208, 210.

The ion removal system 200 of the fourth embodiment further includes an additive input device 212 as a configuration different from the ion removal system 2 of the first embodiment. The additive input device 212 is a device that inputs an additive to the third flow path 38 through which the treated water is allowed to flow. The additive input device 212 of the fourth embodiment inputs carbon dioxide as an additive. By inputting carbon dioxide, the pH of the treated water flowing through the third flow path 38 can be reduced and the turbidity can be reduced. This will be specifically described later.

The controller 214 operates the ion removal system 200 having the above-described configuration in a plurality of operation modes. Specifically, as similar to the ion removal system 2 of the first embodiment, a raw water injection mode, a first crystallization treatment mode, a second crystallization treatment mode, a treated water supply mode, a first cleaning mode, and a second cleaning mode are performed. In the fourth embodiment, unlike the ion removal system 2 of the first embodiment, two kinds of abnormality occurrence modes are performed. The flow of water in these modes is illustrated in FIGS. 20A to 24B.

Figure 20A:
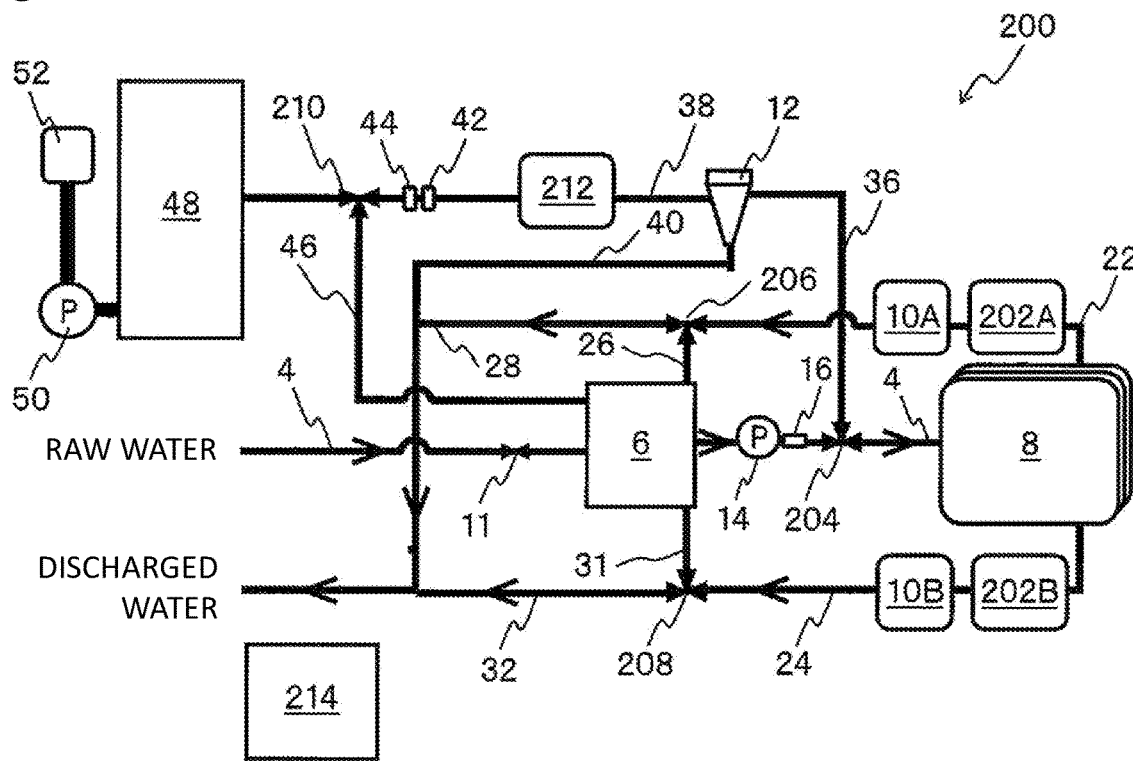
FIG. 20A is a diagram illustrating water flow in a first stage of a raw water injection mode in the fourth embodiment.
Figure 20B:
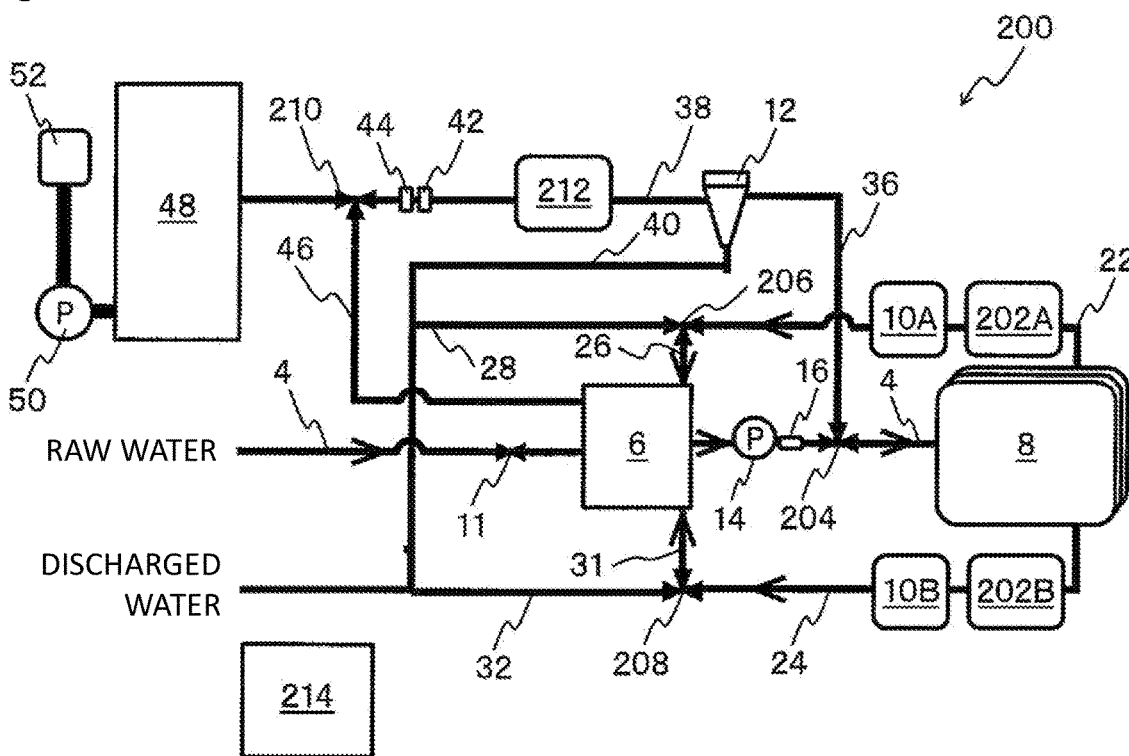
FIG. 20B is a diagram illustrating water flow in a second stage of the raw water injection mode in the fourth embodiment.
Figure 21A:
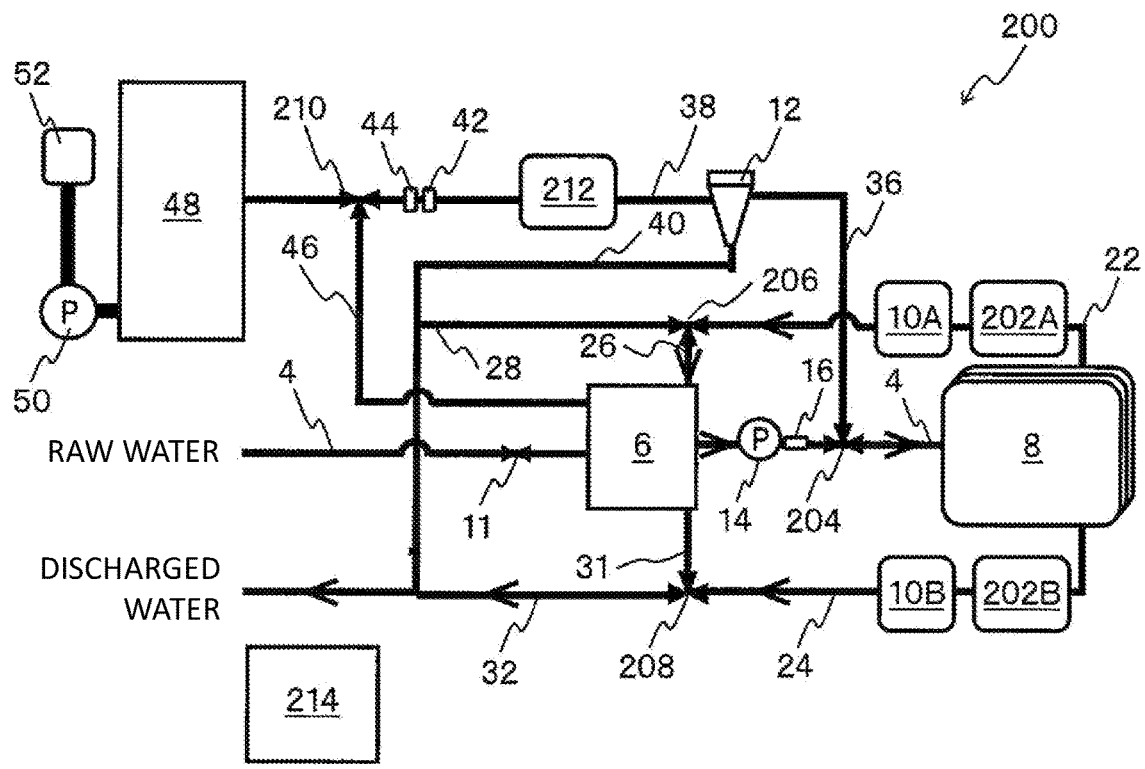
FIG. 21A is a diagram illustrating water flow in a first crystallization treatment mode in the fourth embodiment.
Figure 21B:
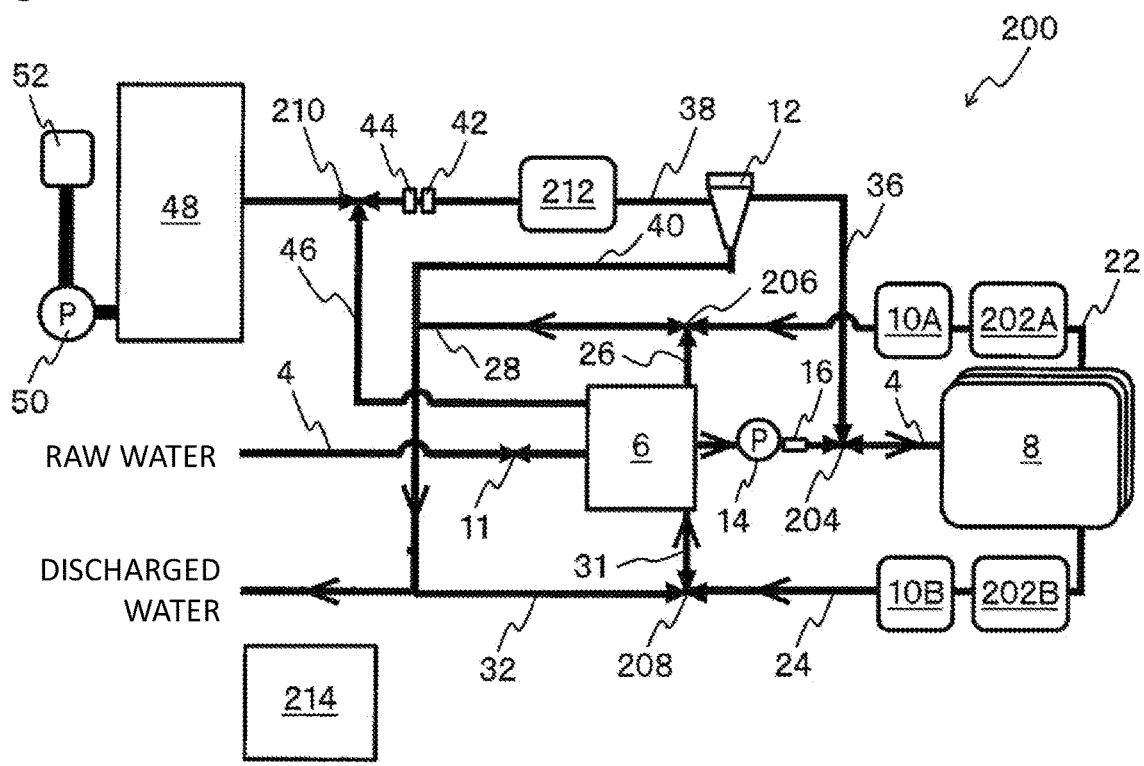
FIG. 21B is a diagram illustrating water flow in a second crystallization treatment mode in the fourth embodiment.
Figure 22:
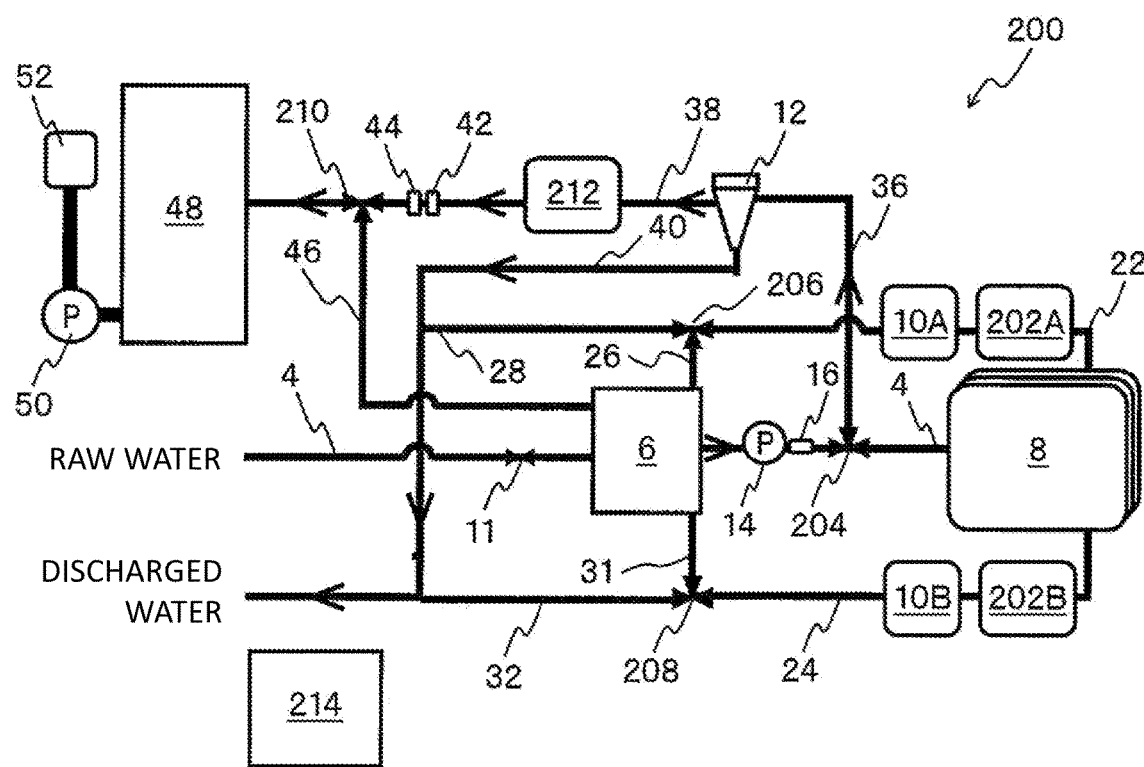
FIG. 22 is a diagram illustrating water flow in a treated water supply mode in the fourth embodiment.
Figure 23A:
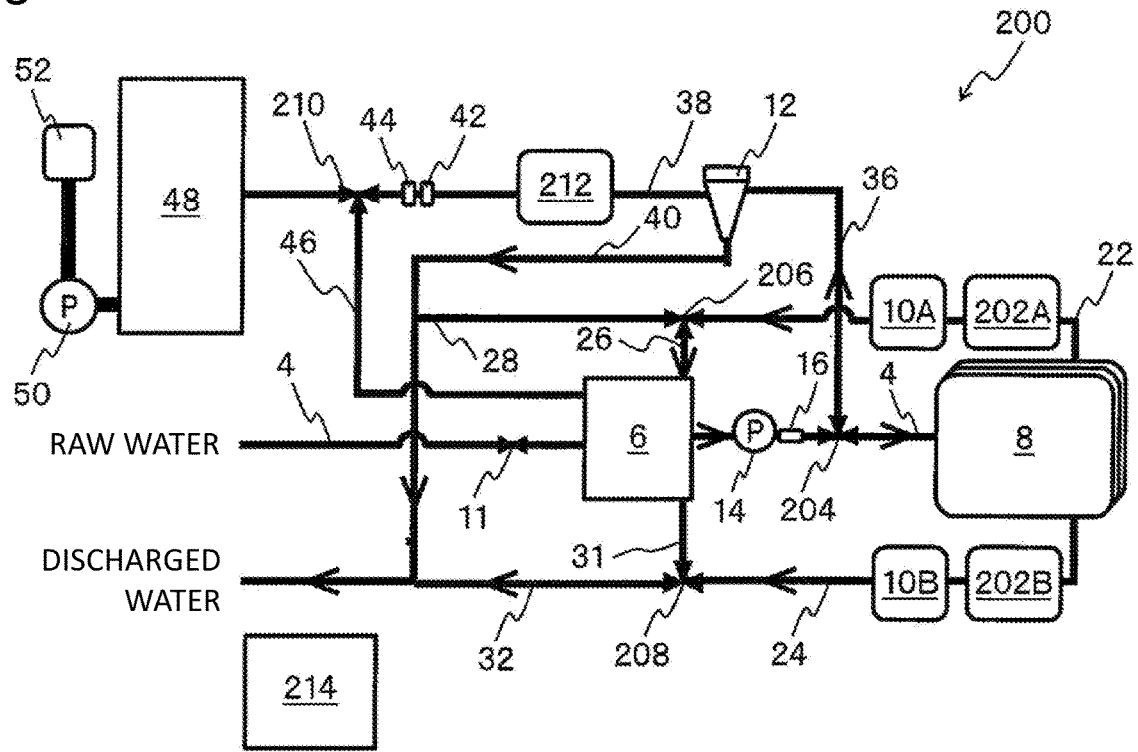
FIG. 23A is a diagram illustrating water flow in a first cleaning mode in the fourth embodiment.
Figure 23B:
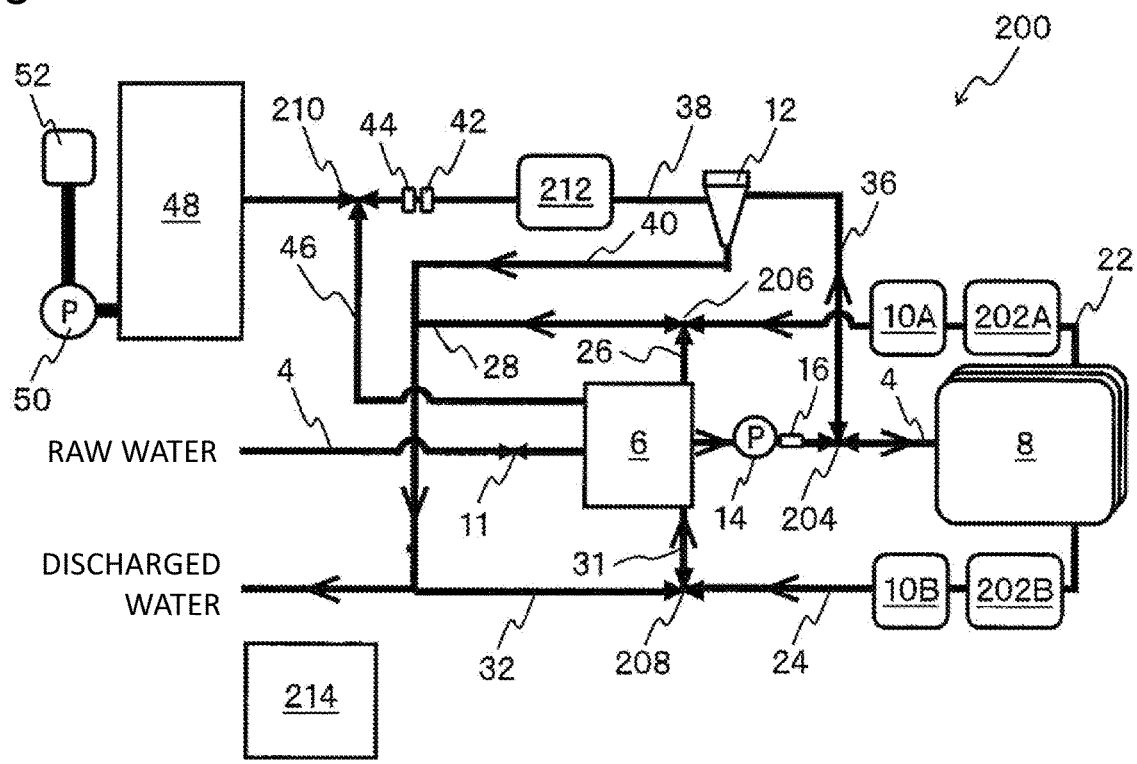
FIG. 23B is a diagram illustrating water flow in a second cleaning mode in the fourth embodiment.
Figure 24A:
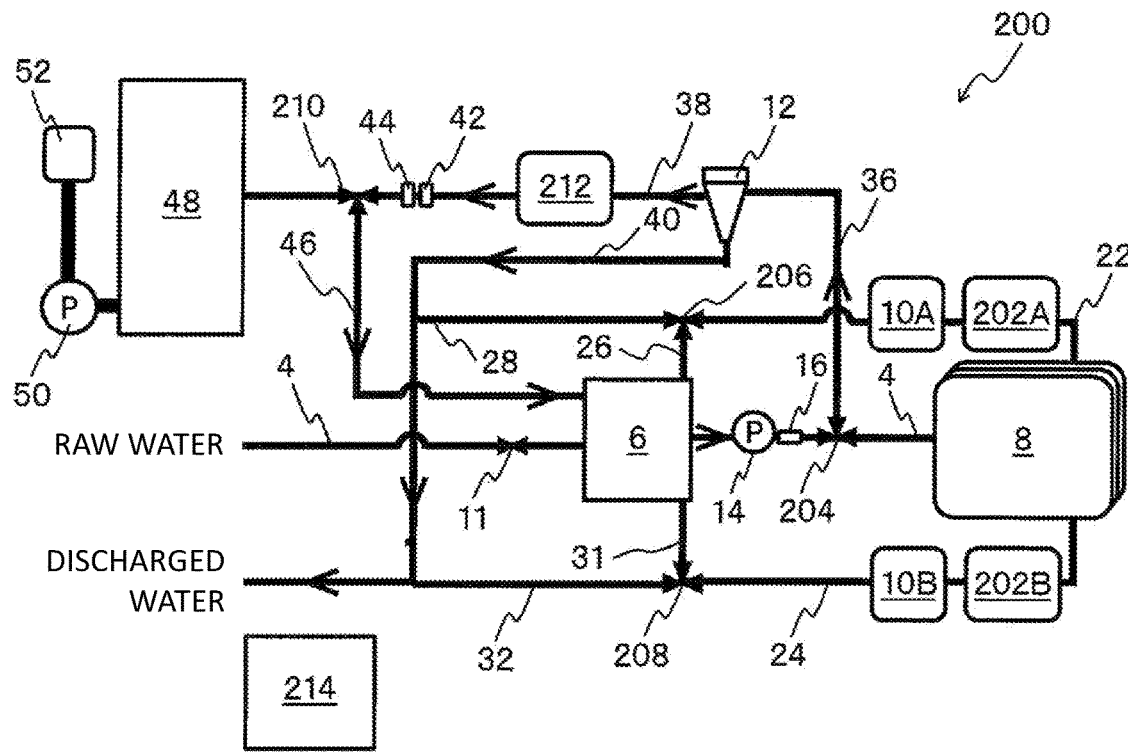
FIG. 24A is a diagram illustrating water flow in a first abnormality occurrence mode in the fourth embodiment.
Figure 24B:
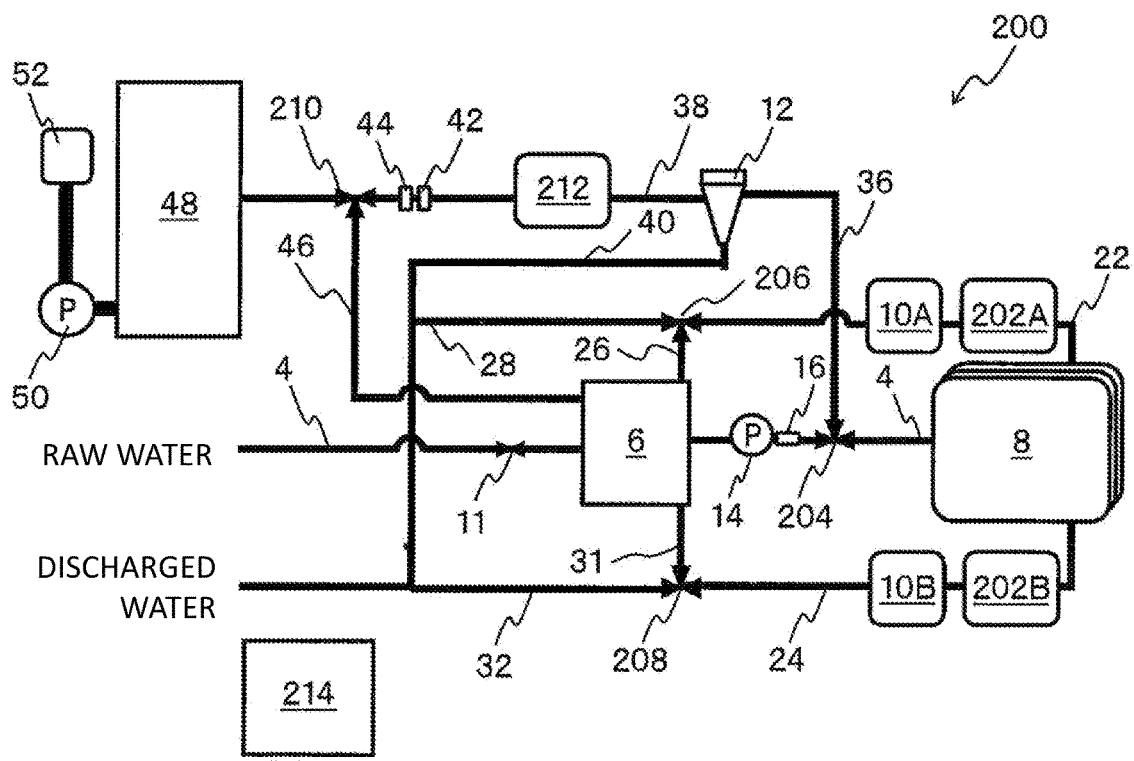
FIG. 24B is a diagram illustrating no water flow in a second abnormality occurrence mode in the fourth embodiment.

FIG. 20A illustrates the first stage of the raw water injection mode and FIG. 20B illustrates the second stage of the raw water injection mode. FIG. 21A illustrates the first crystallization treatment mode, and FIG. 21B illustrates the second crystallization treatment mode. FIG. 22 illustrates the treated water supply mode. FIG. 23A illustrates the first cleaning mode, and FIG. 23B illustrates the second cleaning mode. FIG. 24A illustrates the first abnormality occurrence mode, and FIG. 24B illustrates the second abnormality occurrence mode.

The flow of water in FIGS. 20A to 24A is similar to that in FIGS. 2A to 6 of the first embodiment, and the description thereof is omitted.

Description of control contents common to those of the first to third embodiments will be omitted, and control of the controller 214 in the fourth embodiment will be described.

In the modes illustrated in FIGS. 20A, 20B, 21A, 21B, 23A, and 23B, the controller 214 adjusts the flow rate by adjusting the opening degree of the valve 204 when supplying hard water/treated water from the batch treatment tank 6 to the electrolysis device 8. As similar to this, when the treated water is supplied from the batch treatment tank 6 to the branch flow path 36 in the mode illustrated in FIGS. 22 and 24A, the controller 214 adjusts the flow rate by adjusting the opening degree of the valve 204.

In the mode illustrated in FIGS. 21A and 23A, when alkaline water flows from the first flow path 22 to the first return flow path 26, the controller 214 adjusts the flow rate by adjusting the opening degree of the valve 206. As similar to this, when acid water flows from the second flow path 24 to second discharge flow path 32, the controller 214 adjusts the flow rate by adjusting the opening degree of the valve 208. By the control, the flow rates of alkaline water and acid water generated by the electrolysis device 8 can be adjusted.

In the mode illustrated in FIGS. 21B and 23B, when acid water flows from the first flow path 22 to the first discharge flow path 28, the controller 214 adjusts the flow rate by adjusting the opening degree of the valve 206. As similar to this, in the mode illustrated in FIGS. 21B and 23B, when alkaline water flows from the second flow path 24 to the second return flow path 31, the controller 214 adjusts the flow rate by adjusting the opening degree of the valve 208. By the control, the flow rates of alkaline water and acid water generated by the electrolysis device 8 can be adjusted.

When the electrolysis device 8 is operated to generate alkaline water and acid water, the controller 214 of the fourth embodiment adjusts the opening degrees of the valves 206, 208 so as to reduce the flow rate of the acid water. Specifically, when the acid water flows through the valve 206 as illustrated in FIGS. 21B and 23B, the opening degree of the valve 206 is set to be smaller than that when the alkaline water flows through the valve as illustrated in FIGS. 21A and 23A, and the flow rate of the acid water is reduced. As similar to this, when the acid water flows through the valve 208 as illustrated in FIGS. 21A and 23A, the opening degree of the valve 208 is set to be smaller than that when the alkaline water flows through the valve as illustrated in FIGS. 21B and 23B, and the flow rate of the acid water is reduced. As described above, the degree of acidity of the acid water in each of the flow paths can be increased by reducing the flow rate of the acid water by setting the degrees of opening of the valves 206, 208 when the acid water flows in the first and second crystallization treatment modes and the first and second cleaning treatment modes to be small. This makes it possible to enhance the effect of cleaning the flow path with acid water.

Next, two kinds of abnormality occurrence modes will be described with reference to FIGS. 24A and 24B. FIG. 24A illustrates the first abnormality occurrence mode, and FIG. 24B illustrates the second abnormality occurrence mode.

(First Abnormality Occurrence Mode)

The first abnormality occurrence mode is similar to the abnormality occurrence mode of the first embodiment, and the water flow illustrated in FIG. 24 is similar to the water flow illustrated in FIG. 6.

In the treated water supply mode illustrated in FIG. 22, the measurement values of the pH sensor 42 and the turbidity sensor 44 may be detected as abnormal values with respect to the treated water supplied from the third flow path 38 to the water storage tank 48. For example, the controller 214 stores a normal numerical range in advance for each of the measurement values of the pH sensor 42 and the turbidity sensor 44, and detects a measurement value outside the numerical range as an abnormal value when detecting the measurement value.

When an abnormal value is detected in at least one of the measurement values of the pH sensor 42 and the turbidity sensor 44, the controller 214 performs control to switch the opening and closing of the valve 210. Specifically, opening and closing of the valve 210 is controlled from the state where water flow is allowed from the third flow path 38 to the water storage tank 48 and is stopped in the third return flow path 46, to the state where a water flow is allowed from the third flow path 38 to the third return flow path 46 and is stopped in the water storage tank 48. As a result, the flow of the arrow illustrated in FIG. 22 is switched to the flow of the arrow illustrated in FIG. 24A.

In the first abnormality occurrence mode illustrated in FIG. 24A, the circulation flow path is configured as a series of flow paths including the third return flow path 46. Specifically, a circulation flow path is configured in which the treated water flows through the third return flow path 46, the batch treatment tank 6, the hard water flow path 4, the branch flow path 36, the separation device 12, and the third flow path 38 in this order.

In the circulation flow path, carbon dioxide is input by the additive input device 212. By inputting carbon dioxide into the treated water, the carbon dioxide is dissolved in the treated water, and the acidity of the treated water increases. As a result, the pH of the treated water in the circulation flow path can be reduced. The carbon dioxide further acts to react with insoluble $CaCO_3$ precipitated as crystals to produce soluble $Ca(HCO_3)_2$, as described in FIG. 12. As a result, the turbidity of the treated water in the circulation flow path can be reduced. As described above, carbon dioxide has a function of reducing both the pH and turbidity of the treated water.

By continuously supplying carbon dioxide to the circulation flow path, even when the measurement value of the pH sensor 42 or the turbidity sensor 44 is detected as an abnormal value, it is possible to bring the measurement value close to a normal value while circulating the treated water.

When the measurement value returns to the normal value, the controller 214 controls opening and closing of the valve 210 to allow the flow of water from the third flow path 38 to the water storage tank 48 and to stop the flow of water in the third return flow path 46. As a result, the flow of water is switched from the first abnormality occurrence mode illustrated in FIG. 24A to the flow of the treated water supply mode illustrated in FIG. 22.

According to the control described above, when an abnormal value is detected with respect to the pH and turbidity of the treated water, carbon dioxide is input to the circulation flow path to reduce the pH and turbidity of the treated water while preventing the treated water from being supplied to the water storage tank 48, and the characteristics of the treated water can be changed. As a result, it is possible to control to supply the treated water having desired characteristics to the water storage tank 48.

The positions where the pH sensor 42 and the turbidity sensor 44 are provided are not limited to the positions illustrated in FIG. 24A and the like. For example, a pH sensor and a turbidity sensor may be provided in the water storage tank 48. In this case, the third return flow path 46 and the valve 210 may be omitted, and a valve and a discharge flow path connected to the valve may be provided between the pump 50 and the water faucet 52. In such a configuration, the controller 214 may control opening and closing of a valve provided between the pump 50 and the water faucet 52 on the basis of a measurement value of a pH sensor or a turbidity sensor provided in the water storage tank 48. Specifically, when the measurement value of the pH sensor or the turbidity sensor is detected as an abnormal value, the controller 214 controls opening and closing of the valve so that water is not allowed to flow through the water faucet 52 but is allowed to flow through the discharge flow path. According to the control, as similar to the first abnormality occurrence mode of the fourth embodiment, the supply of the treated water to the water faucet 52 which is the treated water supply point is controlled on the basis of the measurement value related to the characteristic of the treated water. As a result, the treated water having desired characteristics can be supplied to the user, and the reliability of the ion removal system 200 can be improved.

In the configuration as illustrated in FIG. 24A, since the crystals are separated by the separation device 12, the turbidity of the treated water changes in the branch flow path 36 and the third flow path 38, and the turbidity is smaller in the third flow path 38. By providing the turbidity sensor 44 in the third flow path 38, it is possible to accurately observe the turbidity of the treated water supplied to the water storage tank 48. Since carbon dioxide is input by the additive input device 212, turbidity and pH of the treated water on the downstream side of the additive input device 212 are different from the turbidity and pH on the upstream side. By providing the pH sensor 42 and the turbidity sensor 44 downstream of the additive input device 212, it is possible to accurately observe the turbidity and the pH of the treated water supplied to the water storage tank 48.

The additive added by the additive input device 212 may be other than carbon dioxide as long as it reduces the pH or turbidity of the treated water. A plurality of kinds of additives may be input.

Alternatively, the additive input device 212 may not be provided. When there is no means for reducing the pH and turbidity of the treated water without providing the additive input device 212, control for simply stopping the operation of the ion removal system 200 may be performed instead of the control for circulating the treated water in the circulation flow path including the third return flow path 46. Even in the control, by stopping the supply of the treated water to the water storage tank 48 on the basis of the measurement value of the pH sensor 42 or the turbidity sensor 44, the supply of the treated water to the water faucet 52 which is the treated water supply point can be controlled, and the treated water having desired characteristics can be supplied to the water faucet 52.

Both the pH sensor 42 and the turbidity sensor 44 may be provided, and at least one of the pH sensor 42 and the turbidity sensor 44 may be provided.

According to the ion removal system 200 that performs the first abnormality occurrence mode of the fourth embodiment described above, as similar to the ion removal systems 2, 80 that perform the abnormality occurrence mode of the first to third embodiments, it is possible to provide the ion removal system according to first to tenth aspects as described below.

A first aspect of the present invention is an ion removal system 200 comprising: an electrolysis device 8 that generates alkaline water and acid water by electrolysis; a hard water flow path 4 that is connected to the electrolysis device 8 and supplies hard water to the electrolysis device 8; fine bubble generation devices 10A, 10B that generate fine bubbles in a flow path upstream or downstream of the electrolysis device 8; a first treated water flow path (branch flow path 36) through which treated water after supply of fine bubbles containing alkaline water generated by the electrolysis device 8 flows; a water storage tank 48 that stores the treated water supplied from the first treated water flow path and is capable of supplying the treated water to a treated water supply point (water faucet 52) for supplying water to a user; a sensor (pH sensor 42, turbidity sensor 44) that acquires a measurement value regarding a characteristic of the treated water or the hard water; and a controller 214, in which the controller 214 controls supply of the treated water to the treated water supply point on the basis of the measurement value from the sensor.

According to the configuration, it is possible to supply desired treated water to the user by controlling the supply of the treated water to the treated water supply point on the basis of the measurement value regarding the characteristic of the treated water or the hard water. Accordingly, the reliability of the ion removal system 200 can be improved.

A second aspect of the present invention is the ion removal system 200 according to the first aspect, further including a valve 210 that switches between allowing and stopping a flow of the treated water to the water storage tank 48, in which the controller 214 controls the supply of the treated water to the treated water supply point by controlling opening and closing of the valve 210 on the basis of the measurement value by the sensor (pH sensor 42, turbidity sensor 44).

According to the configuration, by switching between allowing and stopping a flow of the treated water to the water storage tank 48 or the treated water supply point on the basis of the measurement value by the sensor, it is possible to control not to send the treated water to the treated water supply point when the measurement value is an abnormal value.

A third aspect of the present invention is the ion removal system 200 according to the second aspect, in which the valve 210 further includes a bypass flow path (third return flow path 46) provided upstream of the water storage tank 48 and connected to a middle of the hard water flow path 4 from the valve 210, and the controller 214 switches between a first mode (treated water supply mode) in which water is not allowed to flow through the bypass flow path but flows through the water storage tank 48 and a second mode (first abnormality occurrence mode) in which water is not allowed to flow through the water storage tank 48 but is allowed to flow through the bypass flow path by controlling the opening and the closing of the valve 210 on the basis of the measurement value from the sensor (pH sensor 42, turbidity sensor 44).

According to the configuration, the treated water can be circulated in the circulation flow path including the bypass flow path by allowing the water to flow through the bypass flow path when the measurement value of the sensor is an abnormal value. This makes it possible to take a means for changing the characteristics of the treated water in the circulation flow path.

A fourth aspect of the present invention is the ion removal system 200 according to the third aspect, further including an additive input device 212 that inputs an additive for changing characteristics of the treated water to a circulation flow path including the bypass flow path (branch flow path 36).

According to the configuration, the characteristics of the treated water can be adjusted in the circulation flow path including the bypass flow path.

A fifth aspect of the invention is the ion removal system 200 according to the fourth aspect, in which the additive is carbon dioxide.

According to the configuration, pH and turbidity of the treated water can be reduced by inputting carbon dioxide to the treated water.

A sixth aspect of the present invention is the ion removal system 200 according to any one of the second aspect to the fifth aspect, further including: a separation device 12 that separates crystals of metal component contained in treated water flowing through a first treated water flow path (branch flow path 36); and a second treated water flow path (third flow path 38) that is connected between the separation device 12 and the water storage tank 48 and allows the treated water from which the crystals of the metal component have been removed by the separation device 12 to flow, in which the valve 210 is provided in the second treated water flow path.

According to the configuration, it is possible to store desired treated water in the water storage tank 48 by supplying the treated water from which crystals of the metal component have been removed to the water storage tank 48.

A seventh aspect of the present invention is the ion removal system 200 according to the sixth aspect, in which the sensor (pH sensor 42, turbidity sensor 44) is provided upstream of the valve 210 in the second treated water flow path (third flow path 38).

According to the configuration, by providing the sensor upstream of the valve 210 in the second treated water flow path, the opening and closing of the valve 210 can be switched while monitoring the characteristics of the treated water at a position close to the water storage tank 48. As a result, desired treated water can be supplied to the water storage tank 48.

An eighth aspect of the present invention is the ion removal system 200 according to any one of the first to seventh aspects, further including return flow paths 26, 31 for returning alkaline water or acid water generated by the electrolysis device 8 to the hard water flow path 4, in which the first treated water flow path (branch flow path 36) is a flow path branched from the hard water flow path 4 between a connection point (batch treatment tank 6) at which the return flow paths 26, 31 are connected to the hard water flow path 4 and the electrolysis device 8, and the fine bubble generation devices 10A, 10B generate fine bubbles in a circulation flow path including the hard water flow path 4, the electrolysis device 8, and the return flow paths 26, 31.

According to the configuration, it is possible to perform operation of circulating alkaline water in the circulation flow path including the return flow paths 26, 31, and remove metal ions by fine bubbles while increasing the pH value of water flowing through the circulation flow path. As a result, the crystallization of the metal ions removed by the fine bubbles can be promoted, and the effect of removing the metal ions can be enhanced.

A ninth aspect of the present invention is the ion removal system 200 according to the eighth aspect, further including a batch treatment tank 6 that is provided in a middle of the hard water flow path 4 and stores hard water, in which the return flow paths 26, 31 are connected to the batch treatment tank 6.

According to the configuration, batch treatment can be performed.

A tenth aspect of the present invention is the ion removal system 200 according to any one of the first aspect to the ninth aspect, in which the sensor is at least one of a pH sensor 42 and a turbidity sensor 44.

According to the configuration, the pH and turbidity of the treated water can be monitored. Instead of the pH sensor 42, an ion sensor (ion sensitive field effect transistor (ISFET)) that measures the amount of ions may be used. Instead of the turbidity sensor 44, an infrared sensor that detects light transmittance or an ultrasonic sensor that detects the speed of particles in water may be used.

(Second Abnormality Occurrence Mode)

Next, a second abnormality occurrence mode will be described with reference to FIG. 24.

In the second abnormality occurrence mode, the supply of the treated water to the water faucet 52 which is the treated water supply point is controlled on the basis of the measurement value by the flow rate sensor 16 which is a sensor different from the pH sensor 42 and the turbidity sensor 44.

In any of the modes illustrated in FIGS. 20A to 23B, the measurement value by the flow rate sensor 16 may be detected as an abnormal value for the treated water flowing from the batch treatment tank 6. For example, the controller 214 stores a normal numerical range in advance with respect to the measurement value by the flow rate sensor 16, and detects a measurement value outside the numerical range as an abnormal value when detecting the measurement value.

When detecting the measurement value of the flow rate sensor 16 as an abnormal value, the controller 214 stops the operation of the ion removal system 200, particularly, the operation of the electrolysis device 8. As a result, the electrolysis device 8 is controlled not to perform the electrolysis treatment and not to generate alkaline water and acid water, so that water does not flow into any flow path as illustrated in FIG. 24B. As described above, control is performed so as to stop the supply of the treated water to the water faucet 52 which is the treated water supply point.

When the measurement value of the flow rate sensor 16 is higher than the normal range, there is a possibility that clogging or the like occurs in any of the flow paths of the ion removal system 200. By stopping the operation of the ion removal system 200 in such a case, it is possible to perform recovery work such as eliminating clogging of the flow path while stopping the supply of the treated water to the water faucet 52. As a result, it is possible to control to supply the treated water having desired characteristics to the water faucet 52, and the reliability of the ion removal system 200 can be improved.

A pressure sensor may be used instead of the flow rate sensor 16. Even when the control is performed on the basis of the pressure sensor, abnormality such as clogging in the flow path can be detected.

The positions where the fine bubble generation devices 10A, 10B and the flow rate sensor 16 are provided are not limited to the positions illustrated in FIG. 24B. The fine bubble generation devices 10A, 10B may be provided not only downstream of the electrolysis device 8 but also upstream of the electrolysis device 8. The fine bubble generation devices 10A, 10B and the flow rate sensor 16 may be provided at arbitrary positions as long as the circulation flow path includes the batch treatment tank 6, the electrolysis device 8, the first flow path 22, the second flow path 24, the first return flow path 26, and the second return flow path 31.

For the ion removal system 200 that performs the second abnormality occurrence mode described above, the ion removal system according to the first aspect of the present invention is provided as similar to the ion removal system 200 that performs the first abnormality occurrence mode. Specifically, provided is an ion removal system 200 comprising: an electrolysis device 8 that generates alkaline water and acid water by electrolysis; a hard water flow path 4 that is connected to the electrolysis device 8 and supplies hard water to the electrolysis device 8; fine bubble generation devices 10A, 10B that generate fine bubbles in a flow path upstream or downstream of the electrolysis device 8; a first treated water flow path (branch flow path 36) through which treated water after supply of fine bubbles containing alkaline water generated by the electrolysis device 8 flows; a water storage tank 48 that stores the treated water supplied from the first treated water flow path and is capable of supplying the treated water to a treated water supply point (water faucet 52) for supplying water to a user; a sensor (flow rate sensor 16) that acquires a measurement value regarding a characteristic of the treated water or the hard water; and a controller 214, in which the controller 214 controls supply of the treated water to the treated water supply point on the basis of the measurement value from the sensor.

According to the configuration, it is possible to supply desired treated water to the user by controlling the supply of the treated water to the treated water supply point on the basis of the measurement value regarding the characteristic of the treated water or the hard water. Accordingly, the reliability of the ion removal system 200 can be improved.

According to the ion removal system 200 that performs the second abnormality occurrence mode described above, it is possible to provide an ion removal system according to eleventh to seventeenth aspects as described below.

An eleventh aspect of the present invention is the ion removal system according to the first aspect, in which the controller 214 controls the supply of the treated water to the treated water supply point (water faucet 52) by controlling ON/OFF of the electrolysis device 8 on the basis of the measurement value by the sensor (flow rate sensor 16).

According to the configuration, when an abnormality occurs, the operation of the electrolysis device 8 can be automatically stopped, and the treated water can be prevented from being supplied to the water storage tank 48 and the treated water supply point.

A twelfth aspect of the present invention is the ion removal system according to the eleventh aspect, further including return flow paths 26, 31 connected to the hard water flow path 4 so as to return alkaline water or acid water generated by the electrolysis device 8 to the hard water flow path 4, in which the first treated water flow path (branch flow path 36) is a flow path branched from the hard water flow path 4 on a side downstream of a connection point to which the return flow paths 26, 31 are connected in the hard water flow path 4, switching, by a valve 204 provided at a branch point, between allowing and stopping a water flow from the hard water flow path 4 to the first treated water flow path is possible, and the fine bubble generation devices 10A, 10B and the sensor (flow rate sensor 16) are provided in a circulation flow path including the hard water flow path 4, the electrolysis device 8, and the return flow paths 26, 31.

According to the configuration, by providing the circulation flow path, it is possible to perform operation of circulating alkaline water in the circulation flow path, and remove metal ions by fine bubbles while increasing the pH value of water flowing through the circulation flow path. As a result, the crystallization of the metal ions removed by the fine bubbles can be promoted, and the effect of removing the metal ions can be enhanced.

A thirteenth aspect of the present invention is the ion removal system according to the twelfth aspect, further including a batch treatment tank 6 that is provided in a middle of the hard water flow path 4 and stores hard water, in which the return flow paths 26, 31 are connected to the batch treatment tank 6.

According to the configuration, batch treatment can be performed.

A fourteenth aspect of the present invention is the ion removal system according to the thirteenth aspect, in which the sensor (flow rate sensor 16) is provided between the batch treatment tank 6 and the valve 204 in the hard water flow path 4.

According to the configuration, a measurement value can be acquired at a position close to the electrolysis device 8, and ON/OFF control of the electrolysis device 8 can be performed more accurately.

A fifteenth aspect of the present invention is the ion removal system according to the fourteenth aspect, further including a pump 14 provided between the batch treatment tank 6 and the valve 204 in the hard water flow path 4, in which the sensor (flow rate sensor 16) is provided between the pump 14 and the valve 204.

According to the configuration, a measurement value can be acquired at a position close to the electrolysis device 8, and ON/OFF control of the electrolysis device 8 can be performed more accurately.

A sixteenth aspect of the present invention is the ion removal system according to any one of the eleventh to fifteenth aspects, in which the sensor is the flow sensor 16 or a pressure sensor.

According to the configuration, abnormality such as clogging in the flow path can be detected.

The present invention is not limited to the above embodiments, and can be implemented in various other aspects. For example, in the first embodiment, the case where the fine bubble generation devices 10A, 10B automatically generate fine bubbles with respect to water flowing through the fine bubble generation devices 10A, 10B has been described, but the present invention is not limited to such a case. The fine bubble generation devices 10A, 10B may be electrically operated, and the fine bubbles may be supplied only when the controller 13 drives the fine bubble generation devices 10A, 10B.

By appropriately combining the various aspects described above, the effects of the aspects can be achieved.

Although the present invention has been fully described in connection with preferred embodiments with reference to the accompanying drawings, various changes and modifications will be apparent to those skilled in the art. Such changes and modifications are to be understood as being included within the scope of the present invention as set forth in the appended claims. Combinations of elements and changes in order in the embodiments can be achieved without departing from the scope and spirit of the present invention.

INDUSTRIAL APPLICABILITY

The present invention is useful for both an ion removal system for home use and an ion removal system for business use.

DESCRIPTION OF REFERENCE NUMERALS

2 Ion removal system
4 Hard water flow path
6 Batch treatment tank
8 Electrolysis device
10A, 10B Fine bubble generation device
11 Valve
12 Separation device
13 Controller
14 Pump
16 Flow rate sensor
18 Valve (third valve)
20 Valve
22 First flow path
24 Second flow path
26 First return flow path
28 First discharge flow path
30 Valve (first valve)
31 Second return flow path
32 Second discharge flow path
34 Valve (second valve)
36 Branch flow path (first treated water flow path)
38 Third flow path (second treated water flow path)
40 Third discharge flow path
42 pH sensor
44 Turbidity sensor
46 Third return flow path
47 Valve
48 Water storage tank
50 Pump
52 Faucet (treated water supply point)
60 Ion removal system
62 Carbon dioxide input device
64, 66, 68 Supply flow path
70, 72 Valve
74 Fine bubble generation device
80 Ion removal system
82 Fine bubble generation device
84A, 84B Separation device 86 Controller
88 First flow path
89 Branch flow path
90 Second flow path
91 Branch flow path
92 Third flow path
93 Valve
94 First return flow path
95 Valve
96 Valve
98 Fourth flow path
100 Second return flow path
101 Valve
102 Third return flow path
104 Fourth return flow path
106 First discharge flow path
108 Second discharge flow path
110 Valve
111 Fifth return flow path
112 Valve
200 Ion removal system
202A, 202B Debubbling device
204, 206, 208, 210 Valve
212 Additive input device
214 Controller

The invention claimed is:

1. An ion removal system comprising:
an electrolysis device configured to generate alkaline water and acid water by electrolysis;
a hard water flow path connected to the electrolysis device to supply the electrolysis device with hard water;
a first flow path and a second flow path through which the alkaline water and the acid water generated by the electrolysis device can alternately flow;
a fine bubble generation device configured to generate and supply fine bubbles to the hard water flow path, the first flow path, or the second flow path so as to adsorb and remove metal ions in water by the fine bubbles generated;
a controller, wherein
the controller controls the electrolysis device to perform a first mode in which the alkaline water is allowed to flow through the first flow path and the acid water is allowed to flow through the second flow path and a second mode in which the acid water is allowed to flow through the first flow path and the alkaline water is allowed to flow through the second flow path;
a first return flow path connected from the first flow path to the hard water flow path;
a second return flow path connected from the second flow path to the hard water flow path;
a first valve configured to switch between allowing and stopping of water flow from the first flow path to the first return flow path; and
a second valve configured to switch between allowing and stopping of water flow from the second flow path to the second return flow path, wherein
the controller controls the first and second valves to allow the water flow from the first flow path to the first return flow path with stopping the water flow from the second flow path to the second return flow path in the first mode, and to stop the water
flow from the first flow path to the first return flow path with allowing the water flow from the second flow path to the second return flow path in the second mode.

2. The ion removal system according to claim 1, further comprising:
a branch flow path branched from the hard water flow path at a point downstream of connection points where the first and second return flow paths are connected to the hard water flow path; and
a third valve configured to switch between allowing and stopping water flow from the hard water flow path to the branch flow path, wherein
the controller controls the third valve to stop the water flow in the branch flow path in the first mode and the second mode, and wherein the controller further performs a third mode as a different mode from the first mode and the second mode for controlling the third valve to allow the water flow through the branch flow path.

3. The system according to claim 2, further comprising a separation device connected to the branch flow path to separates crystals of a metal component contained in the water flow in the branch flow path.

4. The system according to claim 1, further comprising a batch treatment tank provided in the hard water flow path, wherein
the first return flow path and the second return flow path are connected to the batch treatment tank.

5. The system according to claim 2, further comprising a batch treatment tank provided in the hard water flow path, wherein
the first return flow path and the second return flow path are connected to the batch treatment tank.

6. The system according to claim 3, further comprising a batch treatment tank provided in the hard water flow path, wherein
the first return flow path and the second return flow path are connected to the batch treatment tank.

* * * * *